(12) United States Patent
Takenaka

(10) Patent No.: US 9,798,964 B2
(45) Date of Patent: Oct. 24, 2017

(54) IMAGE FORMING APPARATUS USING ACCOUNT INFORMATION MANAGED BY MOBILE TERMINAL APPARATUS ADAPTED TO MULTIUSER MODE FOR PERFORMING AUTHENTICATION PRINTING, SYSTEM, IMAGE FORMING METHOD, AND STORAGE MEDIUM

(71) Applicant: CANON KABUSHIKI KAISHA, Tokyo (JP)

(72) Inventor: Shuichi Takenaka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/714,451

(22) Filed: May 18, 2015

(65) Prior Publication Data
US 2015/0339561 A1 Nov. 26, 2015

(30) Foreign Application Priority Data

May 21, 2014 (JP) .................................. 2014-105413

(51) Int. Cl.
*G06K 15/00* (2006.01)
*B41J 29/00* (2006.01)
(Continued)

(52) U.S. Cl.
CPC .......... *G06K 15/4095* (2013.01); *B41J 29/00* (2013.01); *B41J 29/38* (2013.01); *G06F 1/00* (2013.01); *G06F 3/1222* (2013.01); *G06F 3/1238* (2013.01); *G06F 3/1288* (2013.01); *G06F 3/1292* (2013.01); *H04N 1/00* (2013.01)

(58) Field of Classification Search
None
See application file for complete search history.

(56) References Cited

U.S. PATENT DOCUMENTS 5,956,471 A * 9/1999 Ueda ....................... G06F 21/31
340/10.6
6,832,103 B2 * 12/2004 Namiki ................ H04B 1/3816
380/249
(Continued)

FOREIGN PATENT DOCUMENTS

JP 2012-138071 A 7/2012
JP 2012-178083 A 9/2012

*Primary Examiner* — Paul F Payer
(74) *Attorney, Agent, or Firm* — Carter, Deluca, Farrell & Schmidt, LLP

(57) ABSTRACT

In a case where a plurality of users share the use of one mobile terminal, an image forming apparatus has performed authentication printing also on image data to which the previous owner of the mobile terminal has sent a printing instruction. According to the present embodiment, an image forming apparatus includes a data reception unit configured to receive data having a device ID of a mobile terminal and user information for identifying a user of the mobile terminal, and includes an authentication information reception unit configured to receive authentication information including the device ID and the user information from the mobile terminal. The image forming apparatus also includes a print control unit configured to control, in response to the reception of the authentication information, a printer to print the data received by the data reception unit.

18 Claims, 21 Drawing Sheets

(51) Int. Cl.
*B41J 29/38* (2006.01)
*G06F 1/00* (2006.01)
*H04N 1/00* (2006.01)
*G06F 3/12* (2006.01)

(56) References Cited

U.S. PATENT DOCUMENTS

| | | | | |
|---|---|---|---|---|
| 8,593,677 | B2* | 11/2013 | Nishimi | G06F 3/1204 |
| | | | | 358/1.15 |
| 8,650,658 | B2* | 2/2014 | Schentrup | G06F 21/6218 |
| | | | | 726/27 |
| 9,104,850 | B1* | 8/2015 | Braden | G06F 21/31 |
| 9,178,879 | B2* | 11/2015 | Baliga | G06F 21/34 |
| 2012/0057199 | A1* | 3/2012 | Ikeura | G06F 3/1204 |
| | | | | 358/1.15 |
| 2016/0205082 | A1* | 7/2016 | Puderer | G06F 8/61 |
| | | | | 713/165 |

\* cited by examiner

| PRINT DATA ID | TERMINAL IDENTIFIER | USER INFORMATION | PRINT SETTING | CONTENT INFORMATION |
|---|---|---|---|---|
| 000001 | AA-BBBBBB-CCCCCC-D | 00000241 | Xxxxxx | AAAAA.doc |
| 000002 | AA-BBBBBB-CCCCCC-D | 00000241 | Yyyyy | BBBBB.xls |
| 000003 | AA-BBBBBB-CCCCCC-D | 00000133 | Zzzzzz | CCCCC.doc |
| 000004 | AA-BBBBBB-CCCCCC-D | 00000256 | Xxxxxx | DDDDD.ppt |
| 000005 | AA-BBBBBB-CCCCCC-D | 00000101 | Zzzzzz | EEEEE.doc |
| 000006 | AA-BBBBBB-CCCCCC-D | 00000256 | Wwwww | FFFFF.ppt |
| 000007 | AA-BBBBBB-CCCCCC-D | 00000241 | Zzzzz | GGGGG.pdf |

| FILE NUMBER | CONTENT INFORMATION |
|---|---|
| 000001 | AAAAA.doc |
| 000002 | BBBBB.xls |
| 000003 | GGGGG.pdf |

| FILE NUMBER | CONTENT INFORMATION |
|---|---|
| 000002 | BBBBB.xls |
| 000003 | GGGGG.pdf |

IMAGE FORMING APPARATUS USING ACCOUNT INFORMATION MANAGED BY MOBILE TERMINAL APPARATUS ADAPTED TO MULTIUSER MODE FOR PERFORMING AUTHENTICATION PRINTING, SYSTEM, IMAGE FORMING METHOD, AND STORAGE MEDIUM

BACKGROUND OF THE INVENTION

Field of the Invention

The present invention relates to an image forming apparatus, an image forming method, and a storage medium.

Description of the Related Art

Recently, development of printing techniques has advanced which allows an image forming apparatus to directly print image data stored in a mobile terminal by sending a printing instruction from the mobile terminal to the image forming apparatus. In the field of the printing techniques, development of authentication printing techniques that are intended to improve information security has also advanced in which when an image forming apparatus receives a printing instruction from a mobile terminal, user authentication is performed of a user who uses the mobile terminal.

Japanese Patent Laid-Open No. 2012-138071 discloses an authentication printing technique in which an image forming apparatus performs authentication based on a device identifier of a mobile terminal when the mobile terminal sends a printing instruction to the image forming apparatus, and performs authentication printing when the device identifier of the mobile terminal is authenticated. In the authentication printing technique disclosed in Japanese Patent Laid-Open No. 2012-138071, when a printing instruction is sent from the mobile terminal to the image forming apparatus, a device identifier unique to the mobile terminal is added to image data and transmitted to a document management server. Then, a user who carries the mobile terminal moves closer to the image forming apparatus, operates an operation unit of the image forming apparatus, and sends a printing instruction to the image forming apparatus. When a printing instruction is received from the operation unit, the image forming apparatus executes processing to detect mobile terminals located around the image forming apparatus through a detection device included in the image forming apparatus. When the detection device detects a mobile terminal, the image forming apparatus acquires a device identifier unique to the mobile terminal through the detection device. On the detection of the mobile terminal, the image forming apparatus receives image data corresponding to the received printing instruction from the document management server. Then, if the device identifier unique to the mobile terminal received through the detection device and the device identifier unique to the mobile terminal added to the image data received from the document management server match, the image forming apparatus executes printing processing. A printing system disclosed in Japanese Patent Laid-Open No. 2012-138071 achieves authentication printing by performing the above-described processing.

Japanese Patent Laid-Open No. 2012-178083 discloses another authentication printing technique. In the authentication printing technique disclosed in Japanese Patent Laid-Open No. 2012-178083, an image forming apparatus registers in advance a device identifier unique to a mobile terminal in a device registration table. If a device identifier of a mobile terminal acquired through a short-range communication processing unit is identical to a device identifier unique to the mobile terminal registered in advance in an authentication server, the image forming apparatus transmits login information required for user authentication to the mobile terminal. The mobile terminal tries user authentication to a printing system by using the received login information. If login to the printing system is successful, the mobile terminal causes a job management server to transmit a print job to the image forming apparatus. In the authentication printing technique disclosed in Japanese Patent Laid-Open No. 2012-178083, authentication printing from the mobile terminal is achieved by performing the above-described processing.

SUMMARY OF THE INVENTION

Since the printing system disclosed in Japanese Patent Laid-Open No. 2012-138071 does not perform authentication for each user, when a plurality of users share the use of one mobile terminal, unfortunately authentication printing processing by the image forming apparatus is performed also with respect to image data to which a previous owner of the mobile terminal has sent a printing instruction. If the image forming apparatus stores therein image data, without being outputted, to which the previous owner of the mobile terminal has sent a printing instruction, the image forming apparatus collectively prints both of the image data held by the previous owner and the image data held by the current owner in response to the printing instruction sent by the current owner of the mobile terminal. If the image data held by the previous owner of the mobile terminal is confidential information, security may not be protected.

In the printing system disclosed in Japanese Patent Laid-Open No. 2012-178083, a user needs to register in advance a terminal identifier unique to a mobile terminal in a device registration table. Accordingly, to make the mobile terminal adapted to authentication printing processing, the user needs to change the content of the device registration table every time, and operation management of the printing system may take time and trouble.

An image forming apparatus comprising: a data reception unit configured to receive data which has transmitted from a mobile terminal over a wired or wireless communication network, the data having a device ID of the mobile terminal and user information for identifying a user of the mobile terminal; an authentication information reception unit configured to receive authentication information including the device ID and the user information from the mobile terminal through a short-range wireless communication; and a print control unit configured to control, in response to the reception of the authentication information, a printer to print the data received by the data reception unit.

Further features of the present invention will become apparent from the following description of exemplary embodiments (with reference to the attached drawings).

BRIEF DESCRIPTION OF THE DRAWINGS

FIG. 12 shows a print data list table in the authentication server;

FIG. 13 shows a print data list table in the authentication server;

FIG. 14 shows a request print data table in the image forming apparatus;

DESCRIPTION OF THE EMBODIMENTS

Figure 1:
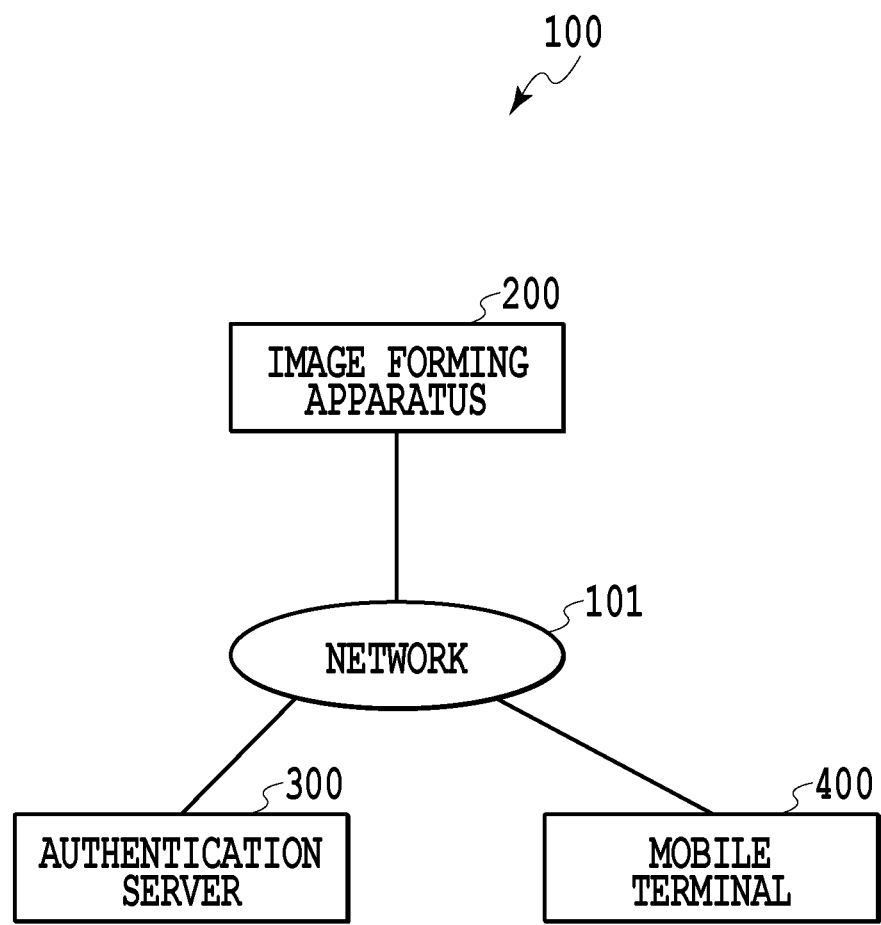
FIG. 1 is a diagram showing an exemplary system configuration.

Embodiments for carrying out the present invention will now be described with reference to the attached drawings. It should be noted that components described in the embodiments are only exemplary and are not intended to limit the scope of the invention.

[Summary]

Recently, mobile terminals such as multi-function mobile phones (hereinafter referred to as "smartphones") and tablet-type mobile terminals have rapidly become widespread. With the mobile terminals becoming widespread, there are an increasing number of cases in which a plurality of users share the use of one mobile terminal. If a plurality of users share the use of one mobile terminal, in terms of information security, it is desired that authorization of access to image data stored in the mobile terminal and permission/rejection of functions such as viewing and editing be selected for each user.

Today, an operating system (OS) installed in the mobile terminal is adapted to a multiuser mode which assumes that the OS is used by a plurality of users. In the multiuser mode, an account is issued for each user to identify a user. The mobile terminal controls for each account authorization of access to image data stored in the mobile terminal and permission/rejection of functions such as viewing and editing. Furthermore, a smartphone uses a SIM card ID (IMSI: International Mobile Subscriber Identity) as information for identifying a user. Traditionally, only when a SIM card having a specified SIM card ID is installed, various functions of the mobile terminal are activated. Today, however, it is possible to cancel such restriction (SIM free) and activate the mobile terminal independent of the type of SIM card. With the SIM free mobile terminal, the user can replace the SIM card so that one mobile terminal can be shared and used among a plurality of users.

Information for identifying a user using a smartphone includes a universally unique identifier (UUID) generated in a specific application on the mobile terminal. While the UUID is limited to the use of the application, the mobile terminal can generate an UUID uniquely determined for each user and control user information based on the UUID as user information. The mobile terminal selects authorization of access to image data stored in the mobile terminal and permission/rejection of functions such as viewing and editing depending on the UUID. Accordingly, it is possible to secure information security even when a plurality of users share the use of one mobile terminal.

In the present invention, the above-described information, such as account information in a multiuser mode (e.g., a user ID, which is less confidential), SIM card ID information, and UUID information, is used for performing authentication printing as the user information. Accordingly, even when a plurality of users share the use of one mobile terminal, it is possible to simply perform authentication for each user and achieve authentication printing with a high level of security.

As described above, the conventional image forming apparatus has a configuration in which authentication printing is performed in a case where only a terminal identifier of a mobile terminal is authenticated. On the other hand, the image forming apparatus of the present invention assumes that a plurality of users share the use of one mobile terminal, and has a configuration in which authentication printing is performed in a case where user information as well as a terminal identifier of a mobile terminal is authenticated.

In an embodiment of the present invention, examples of the user information include account information in a multiuser mode, SIM card ID information, and UUID information. Since such user information is not identification information determined uniquely throughout the world, some user information may overlap. Therefore, authenticating only the user information instead of a terminal identifier to perform authentication printing is not preferable in terms of information security.

[First Embodiment]

FIG. 1 is a diagram showing an exemplary system configuration of an authentication printing system 100 of the present embodiment. The authentication printing system 100 of the present embodiment includes an image forming apparatus 200, an authentication server 300, and a mobile terminal 400. The image forming apparatus 200, the authentication server 300, and the mobile terminal 400 are connected to each other via a network 101.

The network 101 may be in the form of a wide area network (WAN), a local area network (LAN), or the like and may be configured to be wireless or wired.

Figure 2:
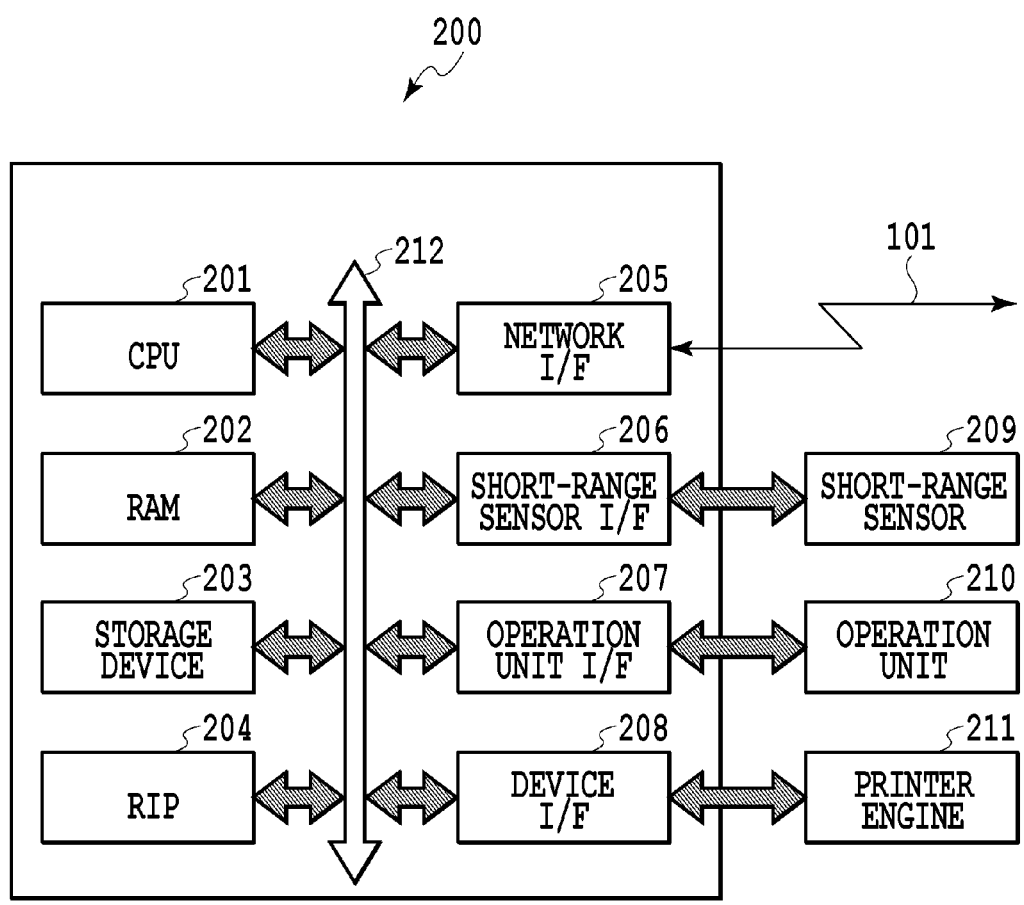
FIG. 2 is a block diagram showing a hardware configuration of an image forming apparatus.

The image forming apparatus 200 may be a multifunction machine having various functions such as scanning, FAX, printing, and copying. Alternatively, the image forming apparatus 200 may be a printing apparatus having only a printing function. When authentication printing is performed, the image forming apparatus 200 acquires authentication information from the mobile terminal 400 through a short-range sensor 209 (FIG. 2).

The mobile terminal 400 may be a mobile phone, a PDA, a smartphone, a tablet, and the like. By way of example, a smartphone will be described in the present embodiment, but the mobile terminal 400 may take any form as long as it acquires a terminal identifier and user information, generates print data, and has a communication function of transmitting the generated print data. The mobile terminal 400 can convert image data that is viewed and edited on the mobile terminal 400 into print data. The mobile terminal 400 can transmit the converted print data to the authentication server 300 by using the communication function of the mobile terminal 400.

When the mobile terminal 400 generates print data, the mobile terminal 400 acquires a terminal identifier of the mobile terminal 400 and adds the acquired terminal identifier to print data. Here, the terminal identifier may be a Media Access Control address (MAC address), an International Mobile Station Equipment Identity (IMEI), or the like, and the mobile terminal 400 acquires identification information determined uniquely throughout the world as a terminal identifier of the mobile terminal 400.

Like the processing of adding a terminal identifier to print data, the mobile terminal 400 acquires user information on a user using the mobile terminal 400 and adds also the acquired user information to the print data. In a case where an OS running on the mobile terminal 400 is adapted to a multiuser mode, the mobile terminal 400 may use account information (e.g., a user ID, which is less confidential) as the user information. In a case where the mobile terminal 400 is a SIM free mobile terminal 400, the mobile terminal 400 may use SIM card ID information as the user information. In a case where the mobile terminal 400 can use a UUID generated in a specific application, the mobile terminal 400 may use the UUID information as the user information.

In the present embodiment, when the mobile terminal 400 sends an authentication printing instruction to the image forming apparatus 200, a terminal identifier and user information are transmitted to the image forming apparatus 200 through a short-range sensor 408 (FIG. 4) and the short-range sensor 209 (FIG. 2) of the image forming apparatus 200. In this case, the terminal identifier and the user information form authentication information.

The authentication server 300 of the present embodiment has the functions of retaining a plurality of pieces of print data for the image forming apparatus 200 to perform printing, and controlling them by associating a terminal identifier and user information, that is, authentication information, with each of the pieces of print data.

Furthermore, the authentication server 300 performs processing of analyzing the content of the image data at a timing when the authentication server 300 receives the print data. As a result of analysis processing of the print data, the authentication server 300 extracts a terminal identifier, user information, and print settings information included in the print data and updates a print data management table 330 which will be described later.

Then, when the image forming apparatus 200 performs authentication printing processing, the authentication server 300 receives authentication information from the image forming apparatus 200. If the authentication server 300 receives authentication information from the image forming apparatus 200, print data to which the corresponding authentication information is added is extracted from a print data group stored in a storage device 304. Details of the processing by the authentication server 300 will be described later with reference to FIG. 19.

FIG. 2 is a block diagram showing a hardware configuration of the image forming apparatus 200 according to the present embodiment.

While FIG. 2 shows the configuration of the image forming apparatus 200 alone, as described with reference to FIG. 1, the image forming apparatus 200, the authentication server 300, and the mobile terminal 400 are connected to each other via the network 101 in a wired/wireless manner. A print job for performing printing processing is transmitted from the mobile terminal 400 or the authentication server 300 to the image forming apparatus via the network 101 or an interface such as a USB. In the embodiment of the present invention, the authentication printing processing is described in a mode in which print data is transmitted from the authentication server 300 to the image forming apparatus 200. In another mode of the present invention, the image forming apparatus 200 may have the function of the authentication server 300. In this case, the image forming apparatus 200 directly receives print data from the mobile terminal 400.

The image forming apparatus 200 shown in FIG. 2 includes a CPU 201, a RAM 202, a storage device 203, a RIP 204, a network I/F 205, a short-range sensor I/F 206, an operation unit I/F 207, and a device I/F 208. The image forming apparatus 200 further includes a short-range sensor 209, an operation unit 210, and a printer engine 211, and the components are communicably connected via a bus 212. Note that "I/F" means "interface" (the same applies to the following).

The CPU 201 includes an arithmetic circuit and has control over the image forming apparatus 200. The RAM 202 is a temporary storage and used at the time of the performance of a computation by the CPU 201. The storage device 203 serves as a storage area and stores therein various kinds of programs. The storage device 203 includes, for example, a hard disk drive (HDD) or a solid state drive (SSD). The CPU 201 loads the programs stored in the storage device 203 into the RAM 202 to perform various kinds of processing.

To achieve parallel processing, the CPU 201 may employ a multiprocessor system having a plurality of processors as hardware. Further, the CPU 201 may have a plurality of processor cores as a microprocessor. It is also possible to use the technique of effectively using an idle time of a register or a pipeline in the processor and operating a single processor as if it is a plurality of processors, such as Hyperthreading.

The RIP 204 (Raster Image Processor) is special-purpose hardware for expanding intermediate print data to a raster image. The RIP 204 is used for processing at high speed the intermediate print data generated on the RAM 202.

The network I/F 205 controls input and output of data between the network 101 and the image forming apparatus 200 based on the control by the CPU 201. It should be noted that connection between the network I/F 205 and the network 101 may be either wire connection or wireless connection.

The short-range sensor I/F 206 controls input/output of data to/from the short-range sensor 209 based on the control by the CPU 201. The short-range sensor I/F 206 and the short-range sensor 209 can employ various kinds of communication standards on condition that they can communicate authentication information in the present embodiment. For example, as the short-range sensor I/F 206 and the short-range sensor 209, short-range wireless communication interfaces compatible with infrared communications, Near Field Communication (NFC), Bluetooth (registered trademark), or the like may be employed.

The operation unit I/F 207 controls input/output of data to/from the operation unit 210 based on the control by the CPU 201. The operation unit I/F 207 outputs image data displayed on the operation unit 210 and transmits information inputted by a user via the operation unit 210 to the CPU 201 as input information. The operation unit 210, for example, has an output device such as a liquid crystal panel or a sound source, and an input device such as a touchscreen display, a keyboard, or a microphone.

The image forming apparatus 200 is connected to a printer engine 211 via the device I/F 208. The device I/F 208 performs transmission of an image signal to the printer engine 211, transmission of a device operation instruction, and reception processing of device information from the printer engine 211 based on the control by the CPU 201.

The printer engine 211 is an output device for outputting an image signal from the image forming apparatus 200 onto a medium such as print paper, and may be an electrophotography type, an ink jet type, or the like.

Furthermore, in another embodiment of the present invention, the image forming apparatus 200 may have the configuration in which a disk drive that can read from/write to a transportable disk storage medium, such as a CD or a DVD, can be connected with the bus 212. Similarly, the image forming apparatus 200 may have the configuration in which a reader/writer or the like that can read from/write to a transportable non-volatile storage medium, such as a flash memory, can be connected with a bus. It is also possible that a program on which the processing content of the present embodiment is described is stored in the storage device 203 via the above-mentioned various media and installed in the image forming apparatus 200.

Figure 3:
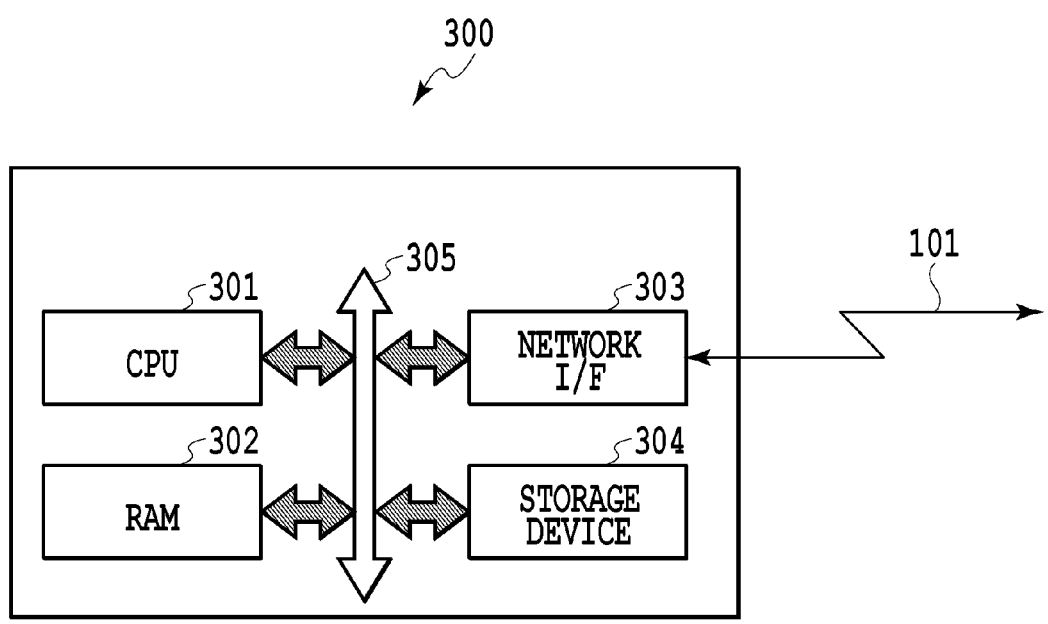
FIG. 3 is a block diagram showing a hardware configuration of an authentication server.

FIG. 3 is a block diagram showing a hardware configuration of the authentication server 300 according to the present embodiment.

The authentication server 300 shown in FIG. 3 includes a CPU 301, a RAM 302, a network I/F 303, and a storage device 304. Further, the components are communicably connected via a bus 305.

The CPU 301 includes an arithmetic circuit and has control over the authentication server 300. The RAM 302 is a temporary storage and used at the time of the performance of a computation by the CPU 301. The storage device 304 serves as a storage area and stores therein various kinds of programs. The storage device 304 includes, for example, a hard disk drive (HDD) or a solid state drive (SSD). The CPU 301 loads the programs stored in the storage device 304 into the RAM 302 to perform various kinds of processing.

The network I/F 303 controls input and output of data between the network 101 and the authentication server 300 based on the control by the CPU 301. It should be noted that connection between the network I/F 303 and the network 101 may be either wire connection or wireless connection.

Furthermore, in another embodiment of the present invention, the authentication server 300 may have the configuration in which a disk drive that can read from/write to a transportable disk storage medium, such as a CD or a DVD, can be connected with the bus 305. Similarly, the authentication server 300 may have the configuration in which a reader/writer or the like that can read from/write to a transportable non-volatile storage medium, such as a flash memory, can be connected with the bus 305 or the like. It is also possible that a program on which the processing content of the present embodiment is described is stored in the storage device 304 via the above-mentioned various media and installed in the authentication server 300.

Figure 4:
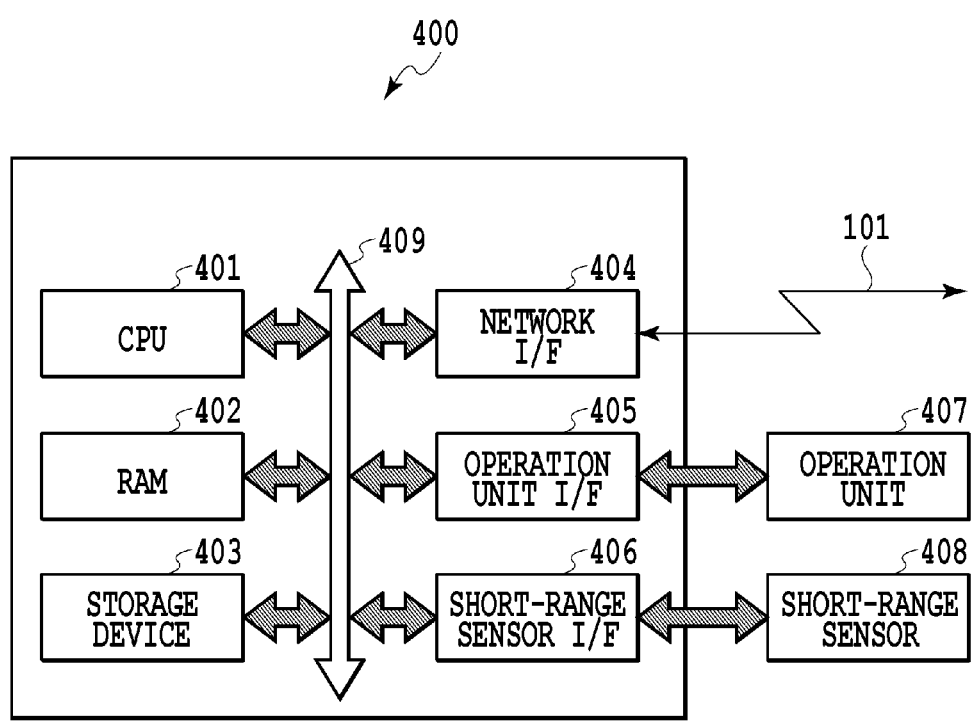
FIG. 4 is a block diagram showing a hardware configuration of a mobile terminal.

FIG. 4 is a block diagram showing a hardware configuration of the mobile terminal 400 according to the present embodiment.

The mobile terminal 400 shown in FIG. 4 includes a CPU 401, a RAM 402, a storage device 403, a network I/F 404, an operation unit I/F 405, a short-range sensor I/F 406, an operation unit 407, and a short-range sensor 408. Furthermore, the components are communicably connected via a bus 409.

The CPU 401 includes an arithmetic circuit and has control over the mobile terminal 400. The RAM 402 is a temporary storage and used at the time of the performance of a computation by the CPU 401. The storage device 403 serves as a storage area and stores therein various kinds of programs and user data such as image data. The storage device 403 includes, for example, a hard disk drive (HDD) or a solid state drive (SSD). The CPU 401 loads the programs stored in the storage device 403 into the RAM 402 to perform various kinds of processing.

The network I/F 404 controls input and output of data between the network 101 and the mobile terminal 400 based on the control by the CPU 401. It should be noted that connection between the network I/F 404 and the network 101 may be either wire connection or wireless connection. The mobile terminal 400 of the present embodiment may access a content server via the network I/F 404 and the network 101 and download application dedicated for the mobile terminal 400, and may be installed in the storage device 403.

The operation unit I/F 405 controls input/output of data to/from the operation unit 407 based on the control by the CPU 401. The operation unit I/F 405 outputs image data displayed on the operation unit 407 and transmits information inputted by a user via the operation unit 407 to the CPU 401 as input information. The operation unit 407, for example, has an output device such as a liquid crystal panel or a sound source, and an input device such as a touchscreen display, a keyboard, or a microphone.

The short-range sensor I/F 406 controls input/output of data to/from the short-range sensor 408 based on the control by the CPU 401. The short-range sensor I/F 406 and the short-range sensor 408 can employ various kinds of communication standards on condition that they can communicate authentication information in the present embodiment. For example, as the short-range sensor I/F 406 and the short-range sensor 408, short-range wireless communication interfaces compatible with infrared communications, Near Field Communication (NFC), Bluetooth (registered trademark), or the like may be employed.

Furthermore, in another embodiment of the present invention, the mobile terminal 400 may have the configuration in which a disk drive that can read from/write to a transportable disk storage medium, such as a CD or a DVD, can be connected with the bus 409. Similarly, the mobile terminal 400 may have the configuration in which a reader/writer or the like that can read from/write to a transportable non-volatile storage medium, such as a flash memory, can be connected with a bus. It is also possible that a program on which the processing content of the present embodiment is described is stored in the storage device 403 via the above-mentioned various media and installed in the mobile terminal 400.

Figure 5:
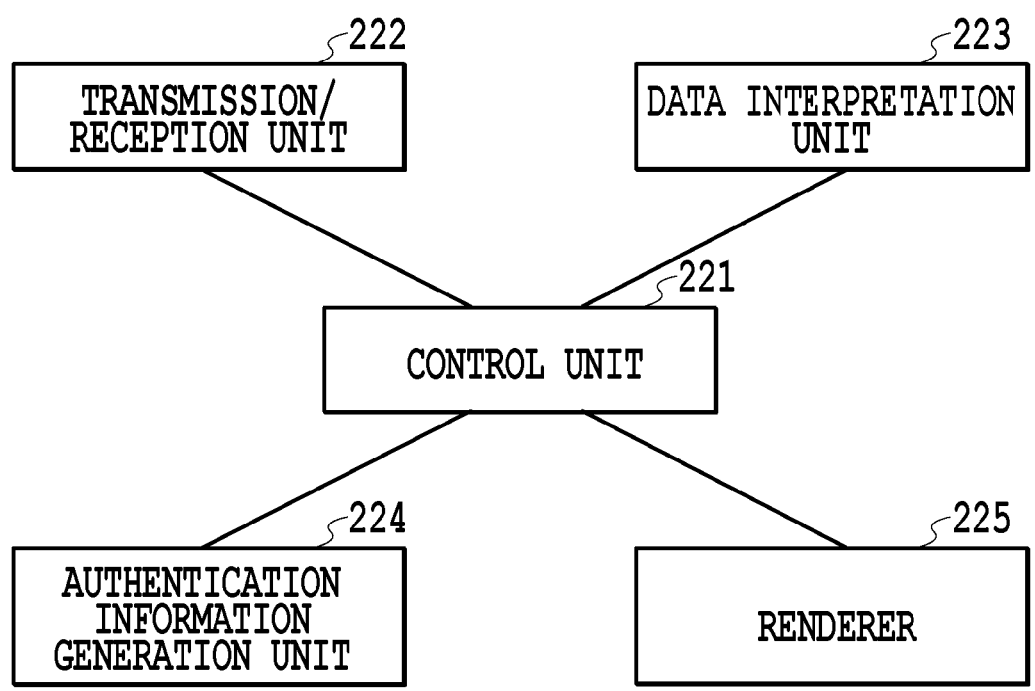
FIG. 5 is a diagram showing an exemplary software module configuration of the image forming apparatus.

FIG. 5 is a diagram showing a software module configuration of the image forming apparatus 200 according to the present embodiment. The software modules shown in FIG. 5 are stored in the storage device 203 as programs, loaded into the RAM 202, and executed by the CPU 201.

A control unit 221 has control over various kinds of processing such as authentication information generation processing, print data transmission/reception processing, data interpretation processing, and image rendering processing. A data interpretation unit reads print data received by a transmission/reception unit via the control unit 221 and interprets rendering information in a document. The rendering information extracted as a result of the data interpretation processing is transmitted to a renderer via the control unit 221 and used for rendering processing. The renderer generates a bitmap image from the rendering information transmitted from the data interpretation unit by using the RIP. The generated bitmap image is transmitted to the printer engine via the device I/F, and image forming processing is performed on print paper.

An authentication information generation unit 224 generates authentication information as to the mobile terminal 400 from a terminal identifier, user information, and the like acquired from the short-range sensor 209. A transmission/reception unit 222 transmits or receives print data, a print data list table 340, generated authentication information, a request print data table 260, and the like via the network I/F 205.

Figure 6:
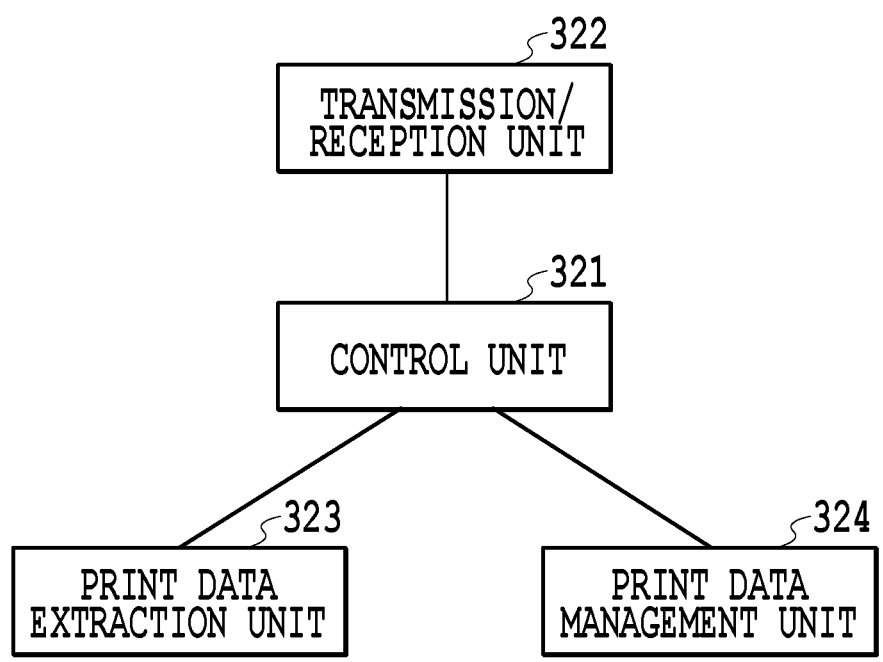
FIG. 6 is a diagram showing an exemplary software module configuration of the authentication server.

FIG. 6 is a diagram showing a software module configuration of the authentication server 300 according to the present embodiment. The software modules shown in FIG. 6 are stored in the storage device 304 as programs, loaded into the RAM 302, and executed by the CPU 301.

A control unit 321 has control over various kinds of processing such as print data transmission/reception processing, storage processing, and authentication processing. A transmission/reception unit 322 receives print data transmitted from the mobile terminal 400, authentication information transmitted from the image forming apparatus 200, and the like via the network I/F 303. Further, the transmission/reception unit 322 transmits the print data list table 340, the print data, and the like to the image forming apparatus 200 via the network I/F 303.

A print data management unit 324 can manage a plurality of pieces of print data and store in the storage device 304 print data to be managed by the print data management unit 324. The print data to be managed by the print data management unit 324 is retained in a data table format in which authentication information including a terminal identifier and user formation is associated with a print setting. Details of a method for storing a data table by the print data management unit 324 will be described later with reference to FIGS. 12 and 17.

A print data extraction unit 323 extracts print data on which printing processing will be performed by the image forming apparatus 200 from print data managed by the print data management unit 324. The print data extraction unit 323 refers to the authentication information received by the control unit 321 and a print data group stored in the storage device 304 by the print data management unit 324 and extracts print data corresponding to the authentication information. The print data extraction unit 323 transmits the extraction result to the image forming apparatus 200 via the control unit 321 and the network I/F.

Figure 7:
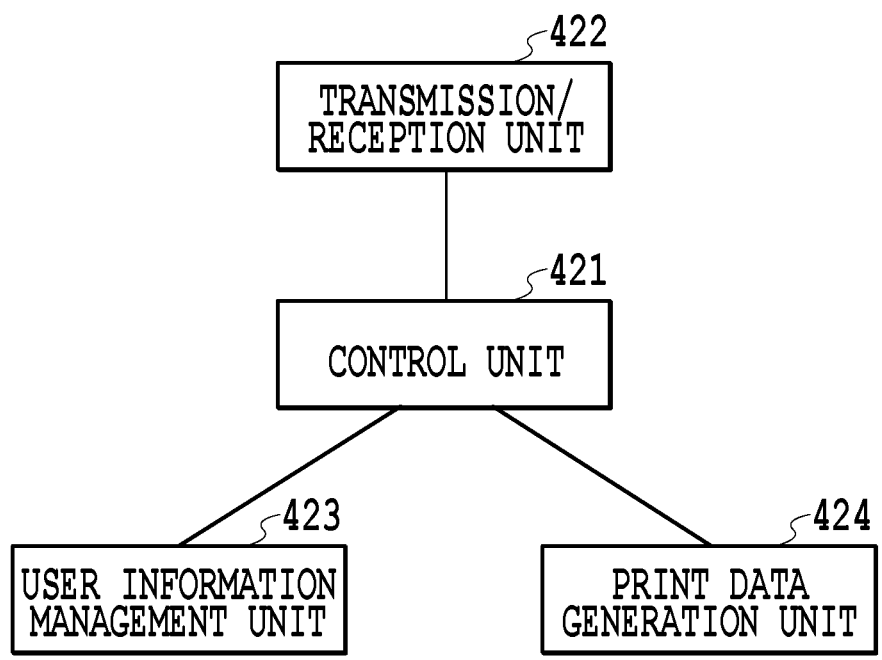
FIG. 7 is a diagram showing an exemplary software module configuration of the mobile terminal.

FIG. 7 is a diagram showing a software module configuration of the mobile terminal 400 according to the present embodiment. The software modules shown in FIG. 7 are stored in the storage device 403 as programs, loaded into the RAM 402, and executed by the CPU 401. A control unit 421 has control over various kinds of processing such as print data generation processing, transmission/reception processing, and user information management processing. A transmission/reception unit 422 transmits print data on which authentication printing will be performed to the authentication server 300 via the network I/F 404.

A print data generation unit 424 converts image data viewed or edited on the mobile terminal 400 into print data. The print data generation unit 424 further performs processing of adding user information managed by a user information management unit 423 and a terminal identifier of the mobile terminal 400 to the print data.

The user information management unit 423 performs user information management processing for controlling access limitation to document data and permission/rejection of viewing and editing functions for each of a plurality of users using the mobile terminal 400.

In the present invention, as the user information, the user information management unit 423 can use account information, SIM card ID information, UUID information in an application, and the like. Further, the user information management unit 423 can manage a plurality of pieces of user information on the single mobile terminal 400. More specifically, an OS (operating system) running on the single mobile terminal 400 can manage the plurality of pieces of user information as respective pieces of account information.

The user information is not limited to the above-mentioned examples. In a case where a plurality of users share the use of one mobile terminal 400, any kind of user information may be used as long as it can be used to identify a user and perform user information management.

Figure 8:
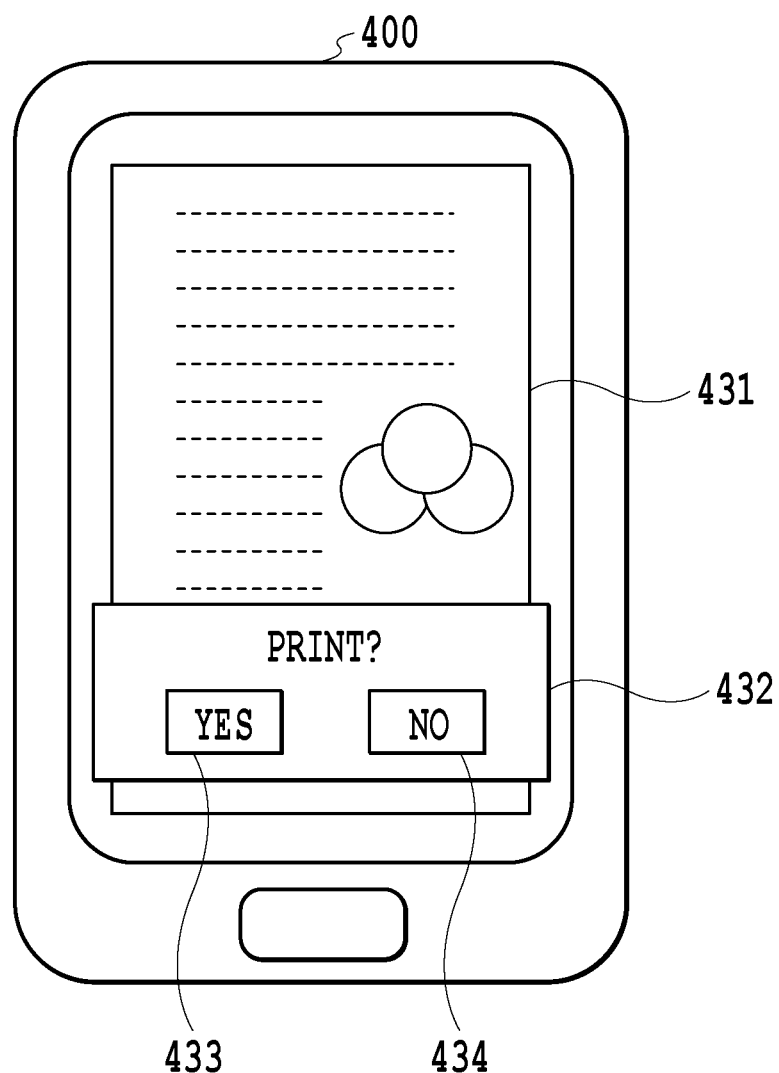
FIG. 8 is a diagram showing an exemplary screen displayed on a touchscreen display of the mobile terminal at the time of instructing authentication printing.

FIG. 8 shows an exemplary screen displayed on the operation unit 407 of the mobile terminal 400 at the time of instructing authentication printing. Screens displayed on the operation unit 407 include a preview 431 and a popup 432. The preview 431 is displayed when a user views or edits image data on the screen of the mobile terminal 400. The popup 432 is displayed when authentication printing is performed on the image data viewed or edited on the screen of the mobile terminal 400.

If the user selects a No button 434 displayed in the popup 432, an authentication printing instruction for the image data displayed as a preview is cancelled. Meanwhile, if the user selects a Yes button 433 displayed in the popup 432, an authentication printing instruction for the image data displayed as a preview is started.

In the present embodiment, image data is defined as data that the user can view or edit on the screen of the mobile terminal 400. Examples of the image data that the user can view or edit on the screen of the mobile terminal 400 include various contents such as texts or images.

Figure 9A:
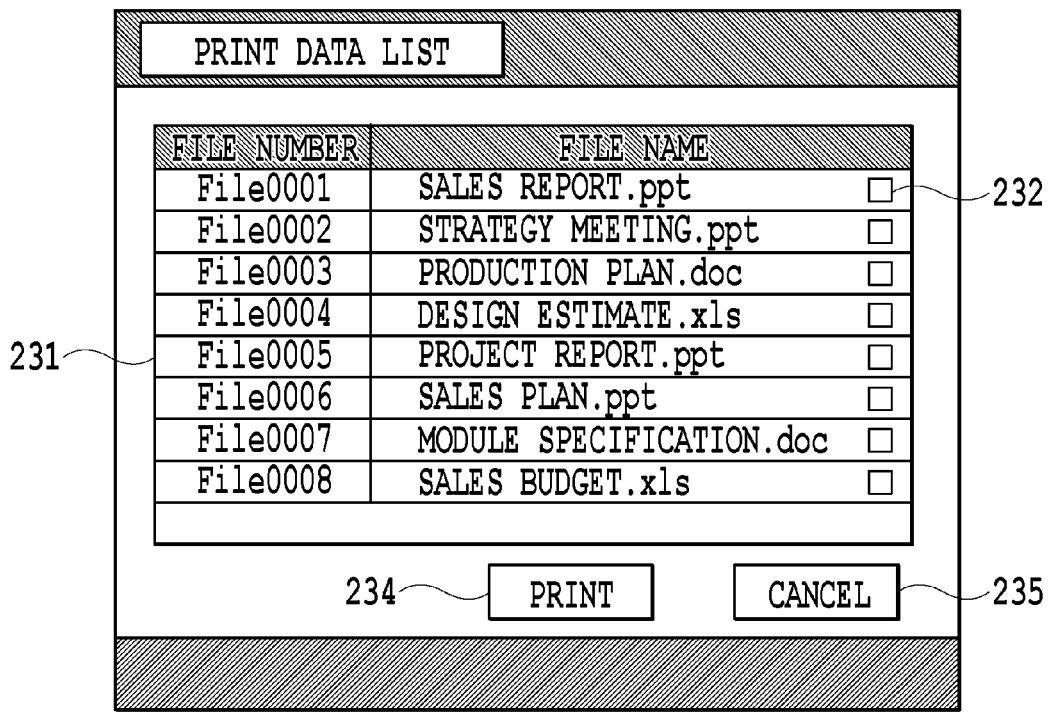
FIGS. 9A and 9B are diagrams showing exemplary screens displayed on an operation unit of the image forming apparatus.

FIG. 9A is a diagram showing an exemplary screen displayed on the operation unit of the image forming apparatus 200. Screens displayed on the operation unit 210 include a print data list 231, a Cancel button 235, and a print button 234. The print data list 231 shows print data on which authentication printing will be performed in a list format. Furthermore, the print data list 231 is provided with check boxes 232 in respective rows of the list to select print data which accepts an authentication printing instruction. It should be noted that the check box 232 serves as a selection acceptance component for accepting target printing data for authentication printing.

In a case where the user sends an authentication printing instruction with respect to a plurality of pieces of print data, the corresponding check boxes 232 are selected to accept target printing data for authentication printing. If the user sends an authentication printing instruction by mistake, the check box 232 may be unmarked so that print data in the print data list 231 corresponding to the check box 232 is excluded from the print data on which authentication printing will be performed.

If the user selects the Cancel button 235 displayed on the operation unit 210, an authentication printing instruction can be cancelled. If the user selects the print button 234 displayed on the operation unit, an authentication printing instruction may be sent to the print data selected in the check box 232. If the print button 234 is selected, print data selected in the check box 232 is received from the authentication server 300, and then print processing is started in the image forming apparatus 200.

Figure 9B:
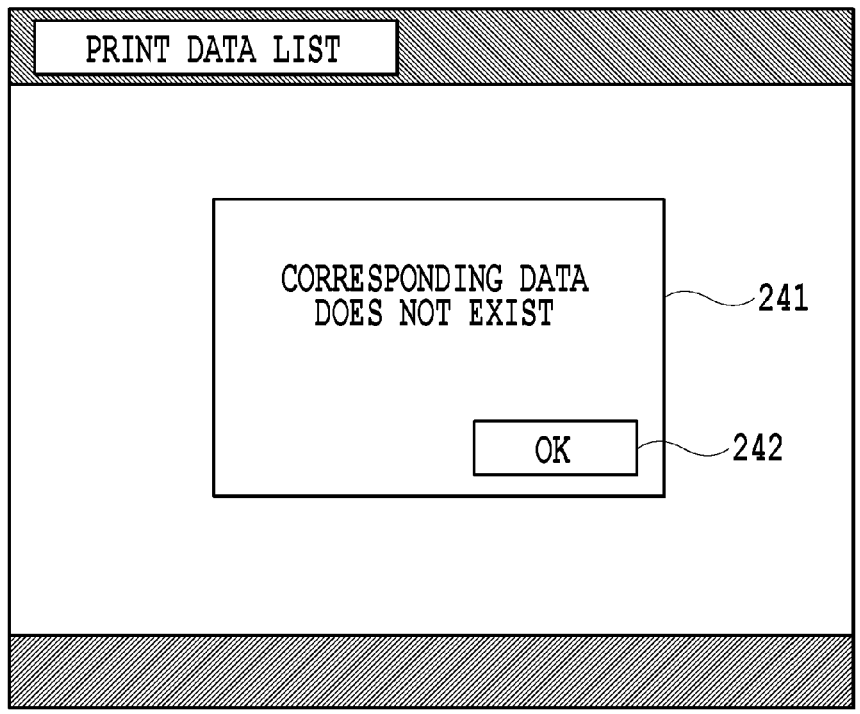

FIG. 9B is a diagram showing an exemplary screen displayed on the operation unit of the image forming apparatus 200. Screens displayed on the operation unit include a popup 241 and an OK button 242. On the screen shown in FIG. 9B, the user is notified of a message that print data for authentication printing does not exist. The popup 241 is displayed if authentication failed and print data for authentication printing does not exist. The user confirms that print data for authentication printing does not exist, and if the OK button 242 displayed in the popup is selected, printing processing is not performed in the image forming apparatus 200, and the authentication printing processing is finished.

Figure 10:
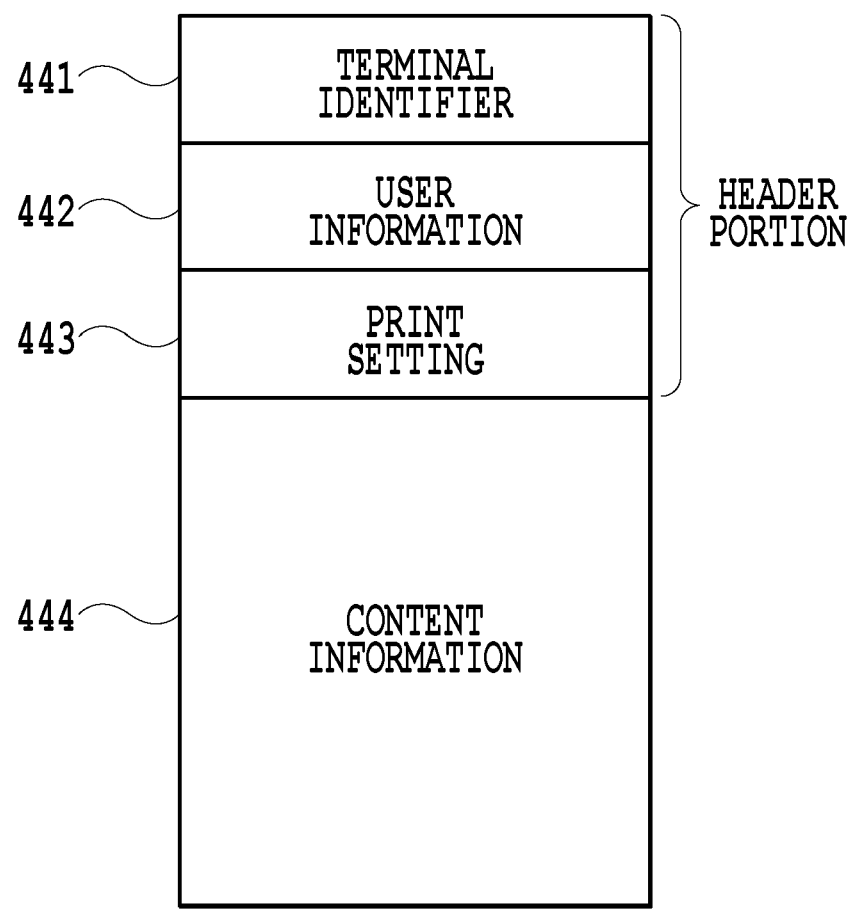
FIG. 10 is a diagram showing an exemplary data structure of print data used in authentication printing according to the present embodiment.

FIG. 10 is a diagram showing an exemplary data structure of print data used in authentication printing according to the present embodiment. In the present embodiment, print data used in authentication printing is generated by the print data generation unit 424 of the mobile terminal 400. The print data shown in FIG. 10 includes a terminal identifier 441, user information 442, a print setting 443, and content information 444. The terminal identifier 441, the user information 442, and the print setting 443 form a header portion, which is added to the content information 444.

The terminal identifier 441 is information for uniquely identifying the mobile terminal 400 of a source. The user information 442 is information for identifying a user, and includes account information in a multiuser mode used in the mobile terminal 400 of a source, a SIM card ID, a UUID, and the like. The print setting 443 is setting information for printing document data, that is, information used to set, for example, color/monochrome, a grouping layout, a stapling position definition, or the like. The content information 444 is information defining the content of rendering image data included in the image data itself. The content information 444 may be in a file format such as a data format of Microsoft Office (registered trademark), but may also be in a PDL format such as PostScript.

Figure 11:
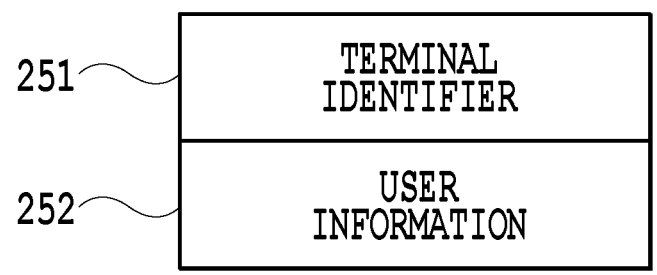
FIG. 11 is a diagram showing an exemplary data structure of authentication information used in authentication printing.

FIG. 11 is a diagram showing an exemplary data structure of authentication information used in authentication printing according to the present embodiment. In the present embodiment, authentication information used in authentication printing is generated by the authentication information generation unit 224 of the image forming apparatus 200. The authentication information generation unit 224 of the image forming apparatus 200 generates authentication information from a terminal identifier 251 of the mobile terminal 400 and user information 252 captured through the short-range sensor 209.

The terminal identifier 251 is information for uniquely identifying the mobile terminal 400 captured through the short-range sensor 209. The user information 252 is information for identifying a user and includes account information in a multiuser mode, a SIM card ID, a UUID, and the like used in the mobile terminal 400 captured through the short-range sensor 209.

FIG. 12 shows a print data management table 330 managed by the print data management unit 324 of the authentication server 300. The authentication server 300 can temporarily retain a plurality of pieces of print data transmitted from the various mobile terminals 400, and the print data management unit 324 manages the plurality of pieces of print data using the print data management table 330. Note that the print data management table 330 is stored in the storage device 304 of the authentication server 300 as data. In a case where the print data retained by the authentication server 300 is printed or in a case where a certain period of time has passed for retaining the print data, the print data is deleted and also removed from the print data management table 330.

The print data management table 330 stores a print data ID, a terminal identifier, user information, a print setting, and content information in respective fields. The print data ID is information for uniquely identifying print data to be printed, and is assigned by the print data management unit 324. The terminal identifier is information for identifying a user such as account information in a multiuser mode being used in the mobile terminal 400 from which print data is transmitted. The print setting is setting information used when image data is printed. The content information is information defining the content of rendering image data included in the image data itself, and more specifically a file name of the image data is used.

FIG. 13 shows a print data list table 340 generated by the print data extraction unit 323 of the authentication server 300 according to the present embodiment. The print data extraction unit 323 of the authentication server 300 compares authentication information transmitted from the image forming apparatus 200 and a plurality of pieces of print data retained in the authentication server 300, and if the authentication information and information included in the print data match, the print data extraction unit 323 extracts the print data. The print data extraction unit 323 manages the extracted print data in the print data list table 340. Note that the print data list table 340 is stored in the storage device 304 of the authentication server 300 as data.

The authentication server 300 transmits the print data list table 340 to the image forming apparatus 200, and the image forming apparatus 200 displays a print data list on a screen of the operation unit based on the received print data list table 340 (FIG. 9A).

The print data list table 340 stores a file number and content information in respective fields. The print data extraction unit 323 adds a file number to each piece of extracted print data if the authentication data and the information included in the print data match. The file number is information for uniquely identifying extracted print data. The content information is information defining the content of rendering image data included in the image data itself, and more specifically a file name of the image data is used.

FIG. 14 shows a request print data table 260 generated in the control unit 221 of the image forming apparatus 200 according to the present embodiment. In the print data list 231 shown in FIG. 9A, the control unit 221 of the image forming apparatus 200 extracts print data which has received an input through a check box 232 in the print data list 231. The control unit 221 manages the extracted print data in the request print data table 260. Note that the request print data table 260 is stored in the storage device 203 of the image forming apparatus 200 as data.

The control unit 221 of the image forming apparatus 200 transmits the request print data table 260 to the authentication server 300. The print data management unit 324 of the authentication server 300 compares information in the request print data table 260 transmitted from the image forming apparatus 200 and print data retained in the authentication server 300, and specifies print data to be printed.

The request print data table 260 stores a file number and content information in respective fields. Since the respective pieces of information are the same as those in the print data list table 340, a description thereof will be omitted.

Figure 15:
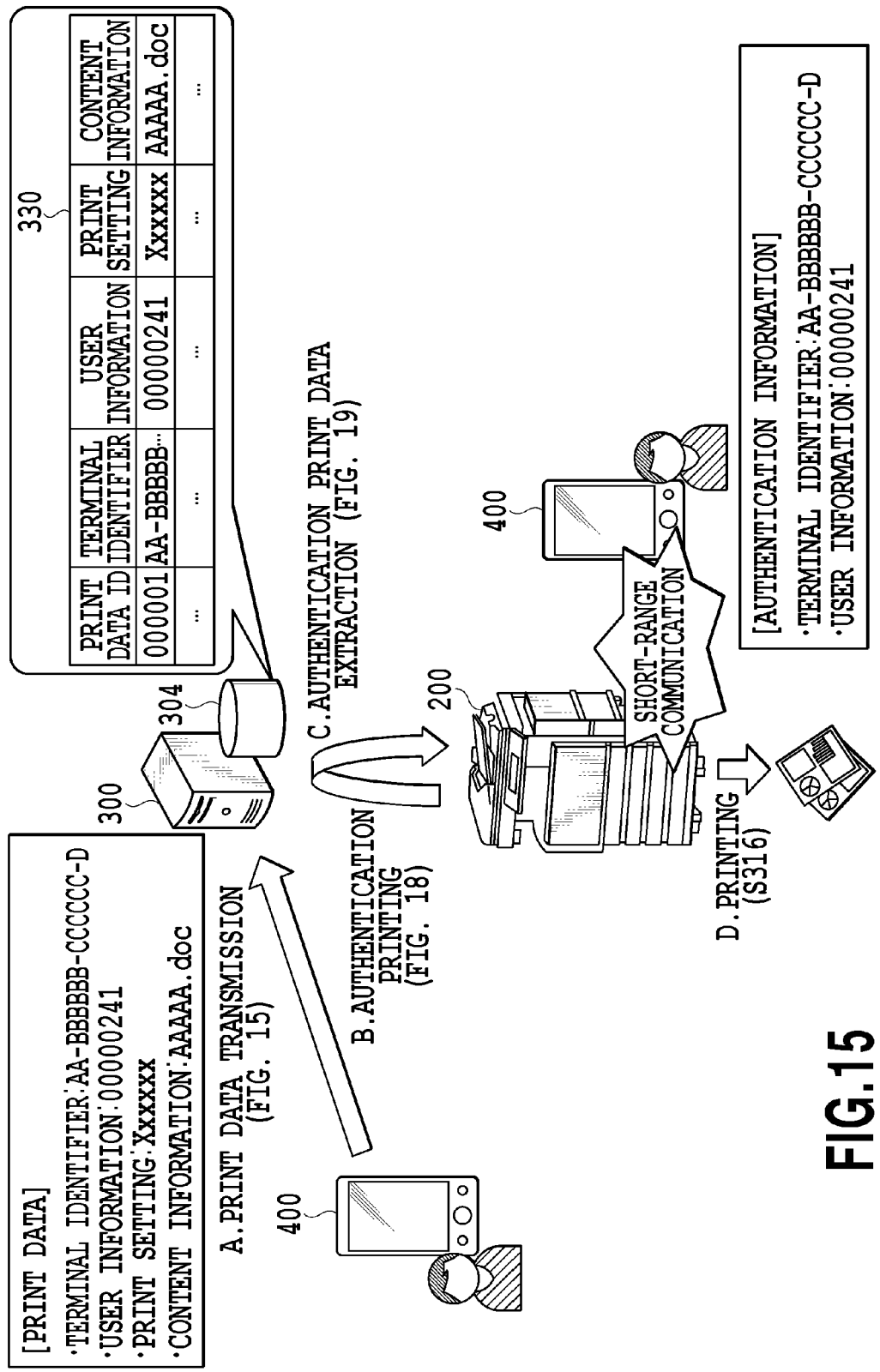
FIG. 15 is a schematic view showing the authentication printing according to a first embodiment.

FIG. 15 is a schematic view showing the authentication printing according to the present embodiment. With reference to the schematic view shown in FIG. 15, authentication printing processing according to the present embodiment will be described with examples of the tables illustrated with reference to FIGS. 12 to 14 and various kinds of information stored in the tables.

First, the control unit 421 of the mobile terminal 400 transmits print data to the authentication server 300. For example, it is assumed that the terminal identifier is "AA-BBBBBB-CCCCCC-D", the user information is "00000241", the print setting is "Xxxxxx", and the content information is "AAAAA.doc" (FIG. 10). In this case, the control unit 421 of the mobile terminal 400 transmits the print data consisting of the terminal identifier, the user information, the print setting, and the content information to the authentication server 300 (A. print data transmission).

The control unit 321 of the authentication server 300 receives the print data consisting of the terminal identifier "AA-BBBBBB-CCCCCC-D", the user information "00000241", the print setting "Xxxxxx", and the content information "AAAAA.doc". The print data management unit 324 of the authentication server 300 stores the print data in the print data management table 330 (FIG. 12).

Next, the control unit 221 of the image forming apparatus 200 transmits the authentication information received from the mobile terminal 400 to the authentication server 300. For example, it is assumed that the terminal identifier is "AA-BBBBBB-CCCCCC-D" and the user information is "00000241" (FIG. 11). In this case, the control unit 221 of the image forming apparatus 200 transmits the authentication data including the terminal identifier and the user information to the authentication server 300 as authentication information (B. authentication printing).

The print data extraction unit 323 of the authentication server 300 extracts print data that matches with the terminal identifier and the user information of the authentication information from the print data management table 330. In the example shown in FIG. 15, print data that matches with the terminal identifier "AA-BBBBBB-CCCCCC-D" and the user information "00000241" of the authentication information is stored in the print data management table 330 (FIG. 12). The print data extraction unit 323 extracts the matching print data, forms the print data list table 340 including the file number "000001" and the content information "AAAAA.doc" (FIG. 13), and transmits it to the image forming apparatus 200 (C. authentication print data extraction).

With reference to the print data list table 340 received from the authentication server 300, the control unit 221 of the image forming apparatus 200 displays a print data list screen (FIG. 9A) on the operation unit. Then, the control unit 221 of the image forming apparatus 200 performs printing processing on paper or the like with respect to the print data selected in the check box 232 (S316). For example, on the print data list screen shown in FIG. 9A, it is assumed that the check box 232 corresponding to the file number "000001" and the file name "AAAAA.doc" is selected. In this case, the control unit of the image forming apparatus 200 performs printing processing on paper or the like on condition that the print button 234 is selected with respect to the print data corresponding to the file name "AAAAA.doc" to which the check box 232 is selected (S316).

Figure 16:
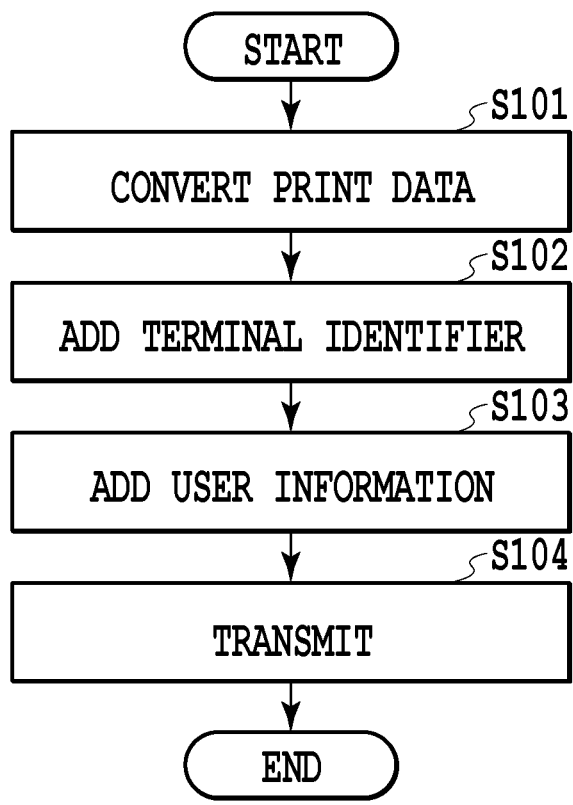
FIG. 16 is a flow chart showing the process of print data transmission in the mobile terminal.

FIG. 16 is a flow chart showing the process of print data transmission in the mobile terminal 400 at the time of authentication printing. With reference to the flow chart shown in FIG. 16, the process of print data transmission from the mobile terminal 400 to the image forming apparatus 200 at the time of authentication printing will be described. If the Yes button 433 (FIG. 8) displayed on the operation unit 407 of the mobile terminal 400 is selected, the processing of the flow chart is started.

In S101, the control unit 421 of the mobile terminal 400 converts the image data viewed and edited on the mobile terminal 400 into print data. The control unit 421 converts the image data into a print data format such as PostScript so that the image forming apparatus 200 can perform rendering processing. While the control unit 421 converts the image data into a print data format in S101 in the present embodiment, the process may proceed to the next step without converting the data format used in a Microsoft Office application or the like in an alternative embodiment. In this case, the image forming apparatus 200 interprets the data format and converts the image data received from the mobile terminal 400 into print data. Further, in S101, the user operates the operation unit 407 of the mobile terminal 400 to make print settings such as color/monochrome, a grouping layout, a stapling position definition, or the like. The various print settings as set are added to the header portion of the print data.

In S102, the control unit 421 acquires a terminal identifier of the mobile terminal 400. The acquired terminal identifier is added to the header portion of the print data as authentication information.

In S103, the control unit 421 acquires user information as to the mobile terminal 400. The acquired user information is added to the header portion of the print data as authentication information.

In S104, the control unit 421 transmits the generated print data to the authentication server 300 via the transmission/reception unit 422.

According to the above-described processing, print data transmission from the mobile terminal 400 to the image forming apparatus 200 is performed at the time of authentication printing.

Figure 17:
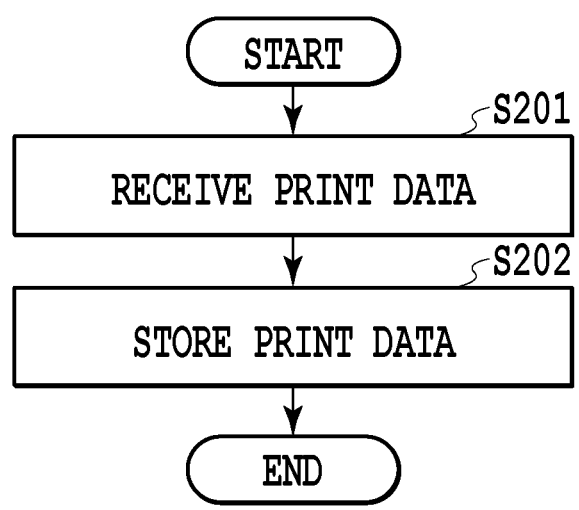
FIG. 17 is a flow chart showing the process of print data reception in the authentication server.

FIG. 17 is a flow chart showing the process of print data reception in the authentication server 300. With reference to the flow chart shown in FIG. 17, the process of print data reception in the authentication server 300 will be described. Once the print data is transmitted from the mobile terminal 400 to the authentication server 300, the processing of the flow chart is started.

In S201, the control unit 321 of the authentication server 300 receives the print data transmitted from the mobile terminal 400.

In S202, the print data management unit 324 of the authentication server 300 stores the received print data in a storage device. Further, in S202, the terminal identifier of the mobile terminal 400 of a source, the user information, and the print setting added to the header portion of the print data are associated with a print data ID for identifying the print data and stored in the print data management table 330.

According to the above-described processing, print data reception in the authentication server 300 is performed.

Figure 18:
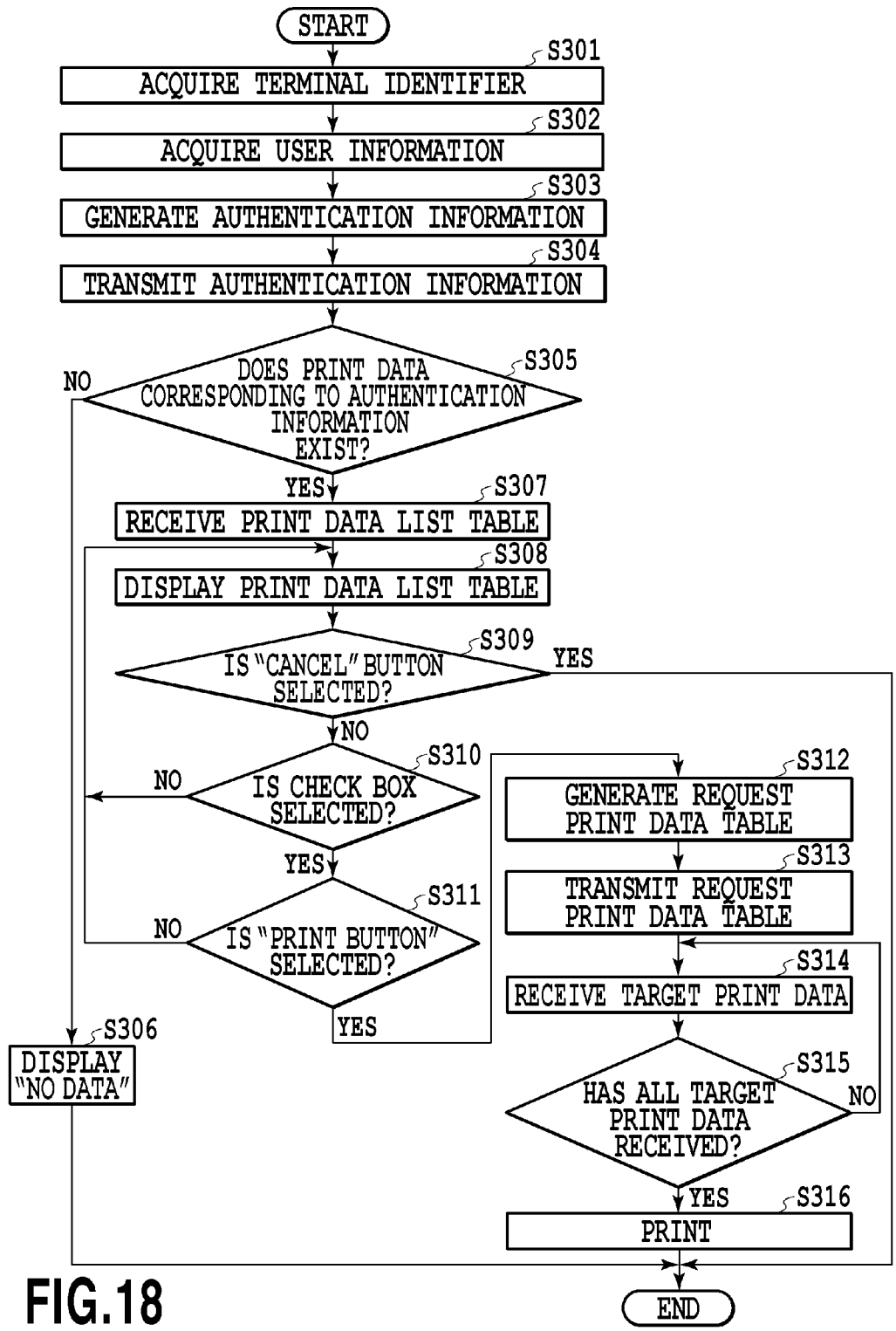
FIG. 18 is a flow chart showing the process of authentication printing in the image forming apparatus.

FIG. 18 is a flow chart showing the process of authentication printing in the image forming apparatus 200. With reference to the flow chart shown in FIG. 18, the process of authentication printing in the image forming apparatus 200 will be described. If the short-range sensor 408 of the mobile terminal 400 is brought into proximity with the short-range sensor 209 of the image forming apparatus 200 and communication between the mobile terminal 400 and the image forming apparatus 200 is started, the processing of the flow chart is started.

In S301, the control unit 221 of the image forming apparatus 200 acquires a terminal identifier of the mobile terminal 400 through the short-range sensor 209.

In S302, the control unit 221 acquires user information as to the mobile terminal 400 through the short-range sensor 209.

In S303, the authentication information generation unit 224 of the image forming apparatus 200 generates authentication information from the terminal identifier of the mobile terminal 400 and the user information acquired in S301 and S302. Note that in S301 and S302, the short-range sensor 209 which receives the terminal identifier and the user information serves as an authentication information reception unit of the present invention.

In S304, the control unit 221 transmits authentication information generated in S303 to the authentication server 300 through the transmission/reception unit 322. In S305 and the following steps, the image forming apparatus 200 is kept in a standby state until the authentication server 300 extracts print data and the image forming apparatus 200 receives the extraction result. After the image forming apparatus 200 receives an extraction result, the processing in S305 and the following steps is restarted.

In S305, after the image forming apparatus 200 receives the extraction result, the control unit 221 refers to the extraction result to determine whether there exists print data corresponding to the authentication information acquired from the mobile terminal 400. If corresponding print data does not exist (S305: No), the process proceeds to S306. If the corresponding print data exists (S305: Yes), the process proceeds to S307.

In S306, the control unit 221 performs processing of displaying on the operation unit 201 a screen notifying that authentication print data does not exist (FIG. 9B). In the present embodiment, the image forming apparatus 200 transmits the authentication information to the authentication server 300, and if the print data management unit 324 of the authentication server 300 does not have print data associated with the authentication information, it is determined that the process proceeds to S306. In this case, the authentication printing processing cannot be continued in present authentication printing system 100. While the screen notifying that authentication print data does not exist (FIG. 9B) is displayed, if the OK button 242 is selected via the user operation unit 210, the processing of the flow chart is finished.

In S307, the control unit 221 receives the print data list table 340 (FIG. 13) from the authentication server 300. The print data list table 340 is generated through authentication print data extraction processing (S408) and transmitted from the authentication server 300.

In S308, the control unit 221 refers to the print data list table 340 received in S307 and displays a print data list screen (FIG. 9A) including a print data list or the like on the operation unit.

In S309, while a print data list screen is displayed on the operation unit 210, the control unit 221 determines whether the Cancel button 235 (FIG. 9A) is selected. If it is determined that the Cancel button 235 is selected (S309: Yes), an instruction to cancel the authentication printing processing is transmitted through the user operation on the operation unit 210 to the control unit 221 of the image forming apparatus 200. Accordingly, the control unit 221 of the image forming apparatus 200 finishes the authentication printing processing. If it is determined that the Cancel button 235 is not selected (S309: No), the process proceeds to S310.

In S310, while a print data list screen is displayed on the operation unit 210, the control unit 221 determines whether one or more check boxes 232 (FIG. 9A) are selected. If one or more check boxes 232 are selected through the user operation on the operation unit 210 (S310: Yes), the process proceeds to S311. If none of the check boxes 232 is selected (S310: No), the process returns to S308, and the processing in S308 and the following steps is repeated. Further, at the same time, the control unit 221 performs processing for activating the print button 234 which allows the selection of the print button 234 to be accepted (FIG. 9A) in response to the determination that one or more check boxes 232 are selected (S310: Yes).

In S311, while a print data list screen is displayed on the operation unit 210, the control unit 221 determines whether the print button 234 (FIG. 9A) is selected. If it is determined that the print button 234 is selected through the user operation on the operation unit 210 (S311: Yes), the process proceeds to S312. If it is determined that the print button 234 is not selected (S311: No), the process returns to S308, and the processing in S308 and the following steps is repeated.

In S312, the control unit 221 generates the request print data table 260 (FIG. 14) with respect to the print data selected in the check box 232 in S310.

In S313, the control unit 221 transmits the request print data table 260 generated in S312 to the authentication server 300 via the transmission/reception unit 222. In the present embodiment, information on print data corresponding to the check box 232 selected in S310 is transmitted to the authentication server 300 as data in a table format. Accordingly, it is possible to selectively transmit a print request with respect to print data that a user wishes to print to the authentication server 300.

In S313, the control unit 221 transmits the request print data table 260 generated in S312 to the authentication server 300. In S314 and the following steps, the image forming apparatus 200 is kept in a standby state until the print data management unit 324 of the authentication server 300 transmits target print data to be printed to the image forming apparatus 200 and the image forming apparatus 200 receives the target print data. After the image forming apparatus 200 receives target print data from the authentication server 300, the processing in S314 and the following steps is restarted.

In S314, the control unit 221 of the image forming apparatus 200 receives the target print data to be printed in S313 from the authentication server 300 via the transmission/reception unit. Then, in S315, the control unit 221 determines whether all of the target print data has been received from the authentication server 300.

If the control unit 221 has received all of the target print data (S315: Yes), printing processing is performed on target print data (S316). Meanwhile, if the control unit 221 has not received all of the target print data (S315: No), the process returns to the processing in S314 to receive target print data from the authentication server 300. Note that while execution of printing processing is started after it is determined whether all of the target print data has been received in S315 in the present embodiment, printing processing may be started whenever it is determined that any print data has been received.

According to the above-described processing, the authentication printing by the image forming apparatus 200 is performed.

Figure 19:
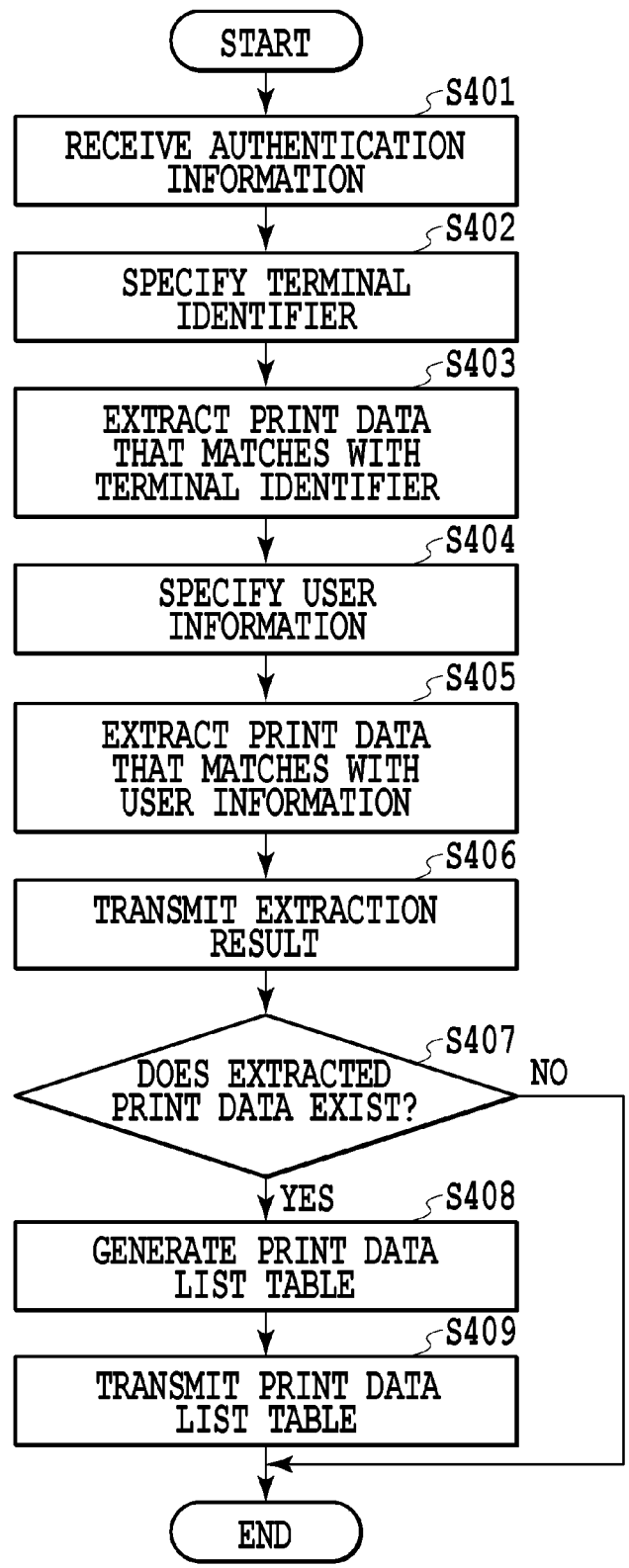
FIG. 19 is a flow chart showing the process of authentication print data extraction in the authentication server.

FIG. 19 is a flow chart showing the process of authentication print data extraction in the authentication server 300. With reference to the flow chart shown in FIG. 19, the process of authentication print data extraction in the authentication server 300 will be described. In S304 (FIG. 18), if authentication information is transmitted from the image forming apparatus 200 to the authentication server 300, the processing of the flow chart is started.

In S401, the transmission/reception unit 322 of the authentication server 300 receives the authentication information transmitted from the image forming apparatus 200.

In S402, the print data extraction unit 323 refers to the print data management table 330 (FIG. 12) and specifies a terminal identifier based on the authentication information received in S401.

In S403, the print data extraction unit 323 extracts a print data group that matches with the terminal identifier specified in S402 based on the print data management table 330 which is referred to in S402.

In S404, the print data extraction unit 323 specifies user information based on the authentication information received in S401.

In S405, the print data extraction unit 323 extracts the print data that matches with the user information specified in S404 from the print data group extracted in S403. In the present embodiment, print data that matches with the user information is further extracted from the print data group of the extraction result in S403, so that print data that matches with a combination of the terminal identifier and the user information is extracted. Performing the above-described processing to extract print data allows authentication in a simple manner for each user and authentication printing with a high level of security even when a printing instruction is sent from a mobile terminal shared by a plurality of users.

In S406, the print data extraction unit 323 transmits the extraction result in S405 to the image forming apparatus 200 via the transmission/reception unit 322. In the present embodiment, if the number of pieces of print data extracted in S406 is equal to or greater than 1, the extraction result of "Corresponding data exists" is transmitted. If the number of pieces of print data extracted in S406 is 0, the extraction result of "Corresponding data does not exist" is transmitted.

In S407, the control unit 321 determines whether there exists print data extracted in S405. If there exists print data extracted in S405 (S407: Yes), the process proceeds to S408. If there exists no print data extracted in S405 (S407: No), the image forming apparatus 200 cannot continue the authentication printing processing as there exists no print data to be printed. Then, the authentication print data extraction processing is finished.

In S408, the control unit 321 generates the print data list table 340 (FIG. 13) from the print data extracted in S405.

In S409, the control unit 321 transmits the print data list table 340 generated in S408 to the image forming apparatus 200. In the present embodiment, the print data extracted in S405 is transmitted to the image forming apparatus 200 as data in a table format as the print data list table 340.

According to the above-described processing, the authentication print data extraction in the authentication server 300 is performed.

Figure 20:
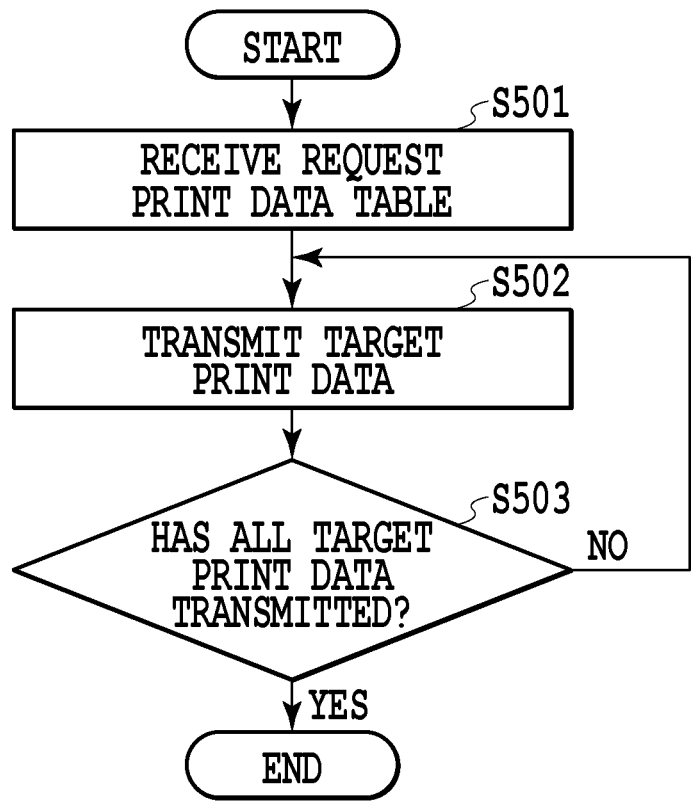
FIG. 20 is a flow chart showing the process of request print data transmission in the authentication server.

FIG. 20 is a flow chart showing the processing in which target print data to be printed as specified by the request print data table 260 is called by the authentication server 300 and transmitted to the image forming apparatus 200. With reference to the flow chart shown in FIG. 20, the processing in which target print data to be printed is called and transmitted to the image forming apparatus 200 will be described. In S313 (FIG. 18), if the request print data table 260 is transmitted from the image forming apparatus 200 to the authentication server 300, the processing of the flow chart is started.

In S501, the control unit 321 of the authentication server 300 receives the request print data table 260 transmitted from the image forming apparatus 200 via the transmission/reception unit 322.

In S502, the print data management unit 324 of the authentication server 300 calls print data to be printed included in the request print data table 260 received in S501 from the storage device 304, and the called target print data is transmitted to the image forming apparatus 200.

In S503, the control unit 321 determines whether all of the print data included in the request print data table 260 received in S501 has been transmitted to the image forming apparatus 200. If all of the target print data included in the request print data table 260 has been transmitted to the image forming apparatus 200 (S503: Yes), the processing of the flow chart is finished. Meanwhile, if all of the target print data included in the request print data table 260 has not been transmitted (S503: No), the process returns to the processing in S502 and the transmission processing of the target print data is repeated.

According to the above processing, the target print data to be printed is called and transmitted to the image forming apparatus 200.

[Second Embodiment]

In the first embodiment, a description has been given of the authentication printing system 100 in which the image forming apparatus 200 performs authentication printing processing by using the terminal identifier of the mobile terminal 400 and the user information to perform printing processing.

In the conventional technique, a printing system is known in which the image forming apparatus 200 or the authentication server 300 manages in advance a plurality of pieces of user information used within an authentication system. In such a printing system, the image forming apparatus 200 performs printing processing if it receives user information from a terminal in the printing system (hereinafter referred to as a "printing instruction terminal") and the received user information matches with one of the above-mentioned plurality of pieces of user information.

In the second embodiment, a description will be given of an authentication printing system 100 in which authentication printing processing to which the technical idea of the present invention is applied is performed by combining the conventional printing system for managing in advance a plurality of pieces of user information with authentication information which is a characterized configuration of the present invention.

Figure 21:
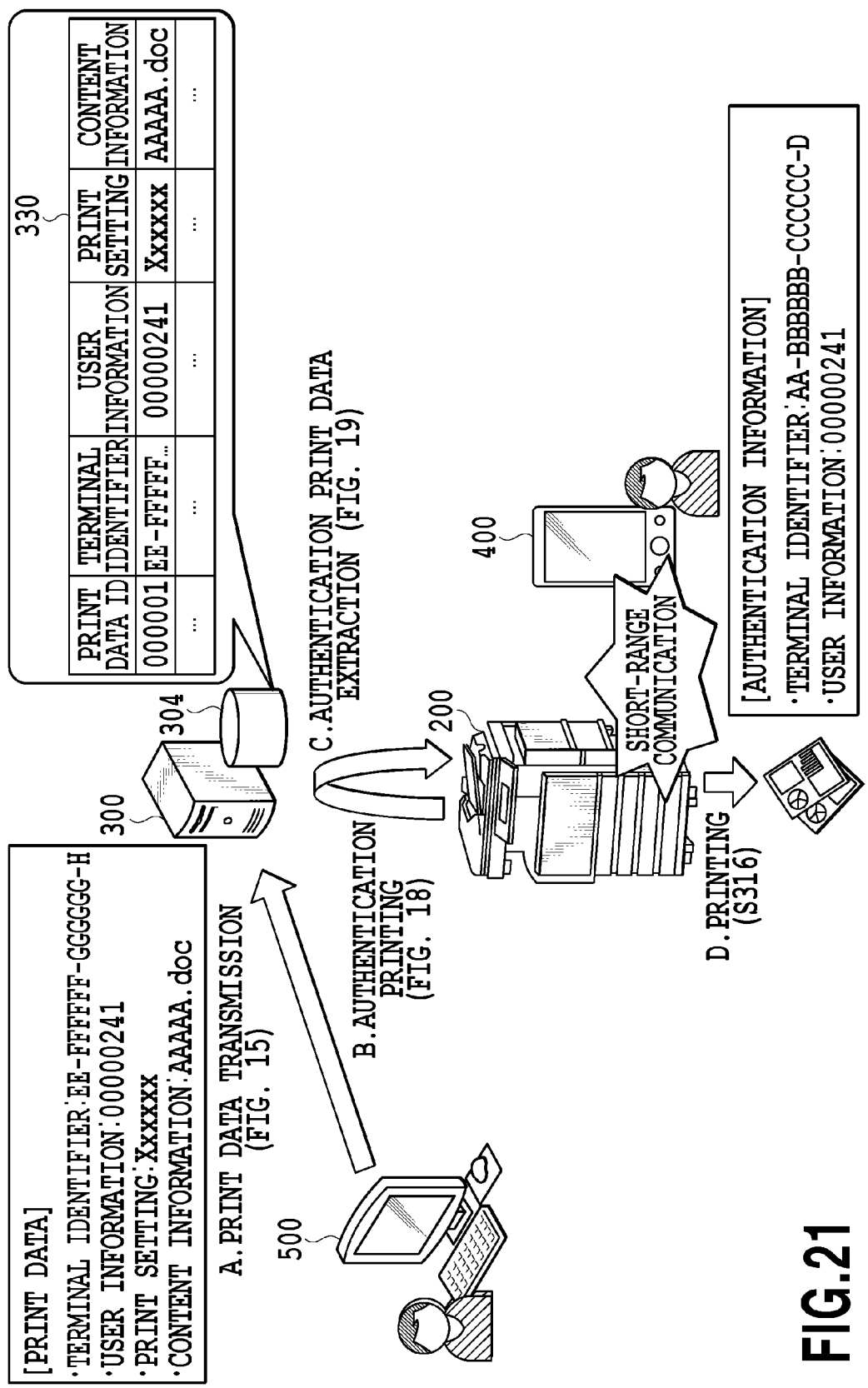
FIG. 21 is a schematic view showing the authentication printing according to a second embodiment.

FIG. 21 is a schematic view showing the process of authentication printing according to the present embodiment. First, a control unit of a printing instruction terminal 500 transmits print data to an authentication server 300. For example, it is assumed that a terminal identifier is "EE-FFFFFF-GGGGGG-D", user information is "00000241", a print setting is "Xxxxxx", and content information is "AAAAA.doc". In this case, the control unit of the printing instruction terminal 500 transmits the print data consisting of the terminal identifier, the user information, the print setting, and the content information to the authentication server 300 (A. print data transmission processing). It should be noted that the above-mentioned printing instruction terminal 500 is a terminal different from a mobile terminal 400 which will be described later, and corresponds to "a first printing instruction terminal" in Claims.

A control unit 321 of the authentication server 300 receives the print data consisting of the terminal identifier "EE-FFFFFF-GGGGGG-D", the user information "00000241", the print setting "Xxxxxx", and the content information "AAAAA.doc". A print data management unit 324 of the authentication server 300 stores the print data in a print data management table 330 (FIG. 12).

Next, a control unit 221 of an image forming apparatus 200 transmits authentication information received from a mobile terminal 400 to the authentication server 300. For example, it is assumed that a terminal identifier is "AA-BBBBBB-CCCCCC-D" and user information is "00000241". In this case, the control unit 221 of the image forming apparatus 200 transmits the authentication data including the terminal identifier and the user information to the authentication server 300 as authentication information (B. authentication printing processing). It should be noted that the above-mentioned mobile terminal 400 is a terminal different from the above-mentioned printing instruction terminal 500, and corresponds to "a second printing instruction terminal" in Claims.

A print data extraction unit 323 of the authentication server 300 extracts print data that matches with the terminal identifier of the authentication information from the print data management table 330. In the example shown in FIG. 21, the terminal identifier of the authentication information is "AA-BBBBBB-CCCCCC-D", whereas the terminal identifier in the print data management table 330 is "EE-FFFFFF-GGGGGG-D". Accordingly, the print data extraction unit 323 cannot extract print data (S403).

In the authentication printing processing according to the present embodiment, even if print data that matches with a terminal identifier cannot be extracted, processing of extracting print data that matches with user information is performed (S405). In the example shown in FIG. 21, the user information of the authentication information is "00000241" and the user information in the print data management table 330 is also "00000241". In this case, the print data extraction unit 323 further determines whether the user information of the authentication information "00000241" matches with one of a plurality of pieces of user information managed by the image forming apparatus 200 or a print server. It should be noted that the processing of comparing the above-mentioned user information of the authentication information with the user information in the print data management table 330 and the processing of comparing a plurality of pieces of user information managed by the image forming apparatus 200 or the print server are performed in S405 of FIG. 19.

If it is determined that the user information of the authentication information "00000241" matches with the user information managed by the image forming apparatus 200 or the print server, the print data extraction unit 323 extracts print data that matches with the user information of the authentication information from the print data management table 330. In the example shown in FIG. 21, print data that matches with the user information of the authentication information "00000241" is stored in the print data management table 330. The print data extraction unit 323 extracts the matching print data, generates a print data list table 340 including the file number "000001" and the content information "AAAAA.doc" (FIG. 13), and transmits it to the image forming apparatus 200 (C. authentication print data extraction processing).

With reference to the print data list table 340 received from the authentication server 300, the control unit 221 of the image forming apparatus 200 displays a print data list screen (FIG. 9A) on an operation unit. Then, the control unit 221 of the image forming apparatus 200 performs printing processing on paper or the like with respect to the print data selected in a check box 232 (S316). For example, on the print data list screen shown in FIG. 9A, it is assumed that the check box 232 corresponding to the file number "000001" and the file name "AAAAA.doc" is selected. In this case, the control unit 221 of the image forming apparatus 200 performs printing processing on paper or the like on condition that a print button 234 is selected with respect to the print data corresponding to the file name "AAAAA.doc" to which the check box 232 is selected (S316).

In the second embodiment of the present invention, even if the terminal identifier of the printing instruction terminal 500 and the terminal identifier of the mobile terminal 400 are different, authentication printing processing can be performed. More specifically, associating a plurality of pieces of user information managed by the image forming apparatus 200 or the authentication server 300 with user information of authentication information allows authentication printing processing to be performed. Therefore, even if the printing instruction terminal 500 transmitting the print data and the mobile terminal 400 transmitting the authentication information via a short-range sensor 209 near the image forming apparatus 200 are different, authentication printing to which the present invention is applied can be performed.

According to the present invention as described above, authentication can be performed in a simple manner for each user and authentication printing with a high level of security can be achieved even if a printing instruction is sent from a mobile terminal shared by a plurality of users.

[Other Embodiments]

In the first and second embodiments, descriptions have been given of the case where the authentication server 300 performs print data extraction processing, but the present invention is not limited to these embodiments. The image forming apparatus 200 may have the function of the authentication server 300 and may perform print data extraction processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)Tm), a flash memory device, a memory card, and the like. According to the image forming apparatus, the image forming method, and the storage medium of the present invention, even when a mobile terminal shared among a plurality of users sends a printing instruction, it is possible to simply perform authentication for each user and achieve authentication printing with a high level of security.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105413, filed May 21, 2014, which is hereby incorporated by reference wherein in its entirety.

What is claimed is:

1. An image forming apparatus comprising:
an authentication information reception unit configured to receive authentication information which is based on at least user information corresponding to a user account for a user using a mobile terminal from the mobile terminal through a short-range wireless communication, the mobile terminal managing one or more user accounts and controlling, for each of the one or more user accounts, an authorization of access to data for printing stored in the mobile terminal; and
a print control unit configured to control, in a case where the received authentication information corresponds to information associated by the mobile terminal with target data for printing, a printer to print the target data, the information associated with the target data being based on at least user information corresponding to one of the one or more user accounts managed by the mobile terminal.

2. The image forming apparatus according to claim 1, wherein the mobile terminal further comprises a user information management unit configured to manage a plurality of pieces of the user information, and
wherein the authentication information is based on at least a device ID of the mobile terminal and one of the plurality of pieces of the user information managed by the user information management unit.

3. The image forming apparatus according to claim 2, wherein the device ID is a media access control address (MAC address) or an International Mobile Station Equipment Identity (IMEI).

4. The image forming apparatus according to claim 1, further comprising:
a display unit configured to display a data list of one or more printable data, the data list being associated with a selection acceptance component configured to accept target data for printing,
wherein the print control unit controls the printer to print the target data which has been accepted by the selection acceptance component.

5. The image forming apparatus according to claim 1, wherein the user information is a user ID of an OS running on the mobile terminal, SIM card ID attached to the mobile terminal, or UUID in an application on the mobile terminal.

6. The image forming apparatus according to claim 1, wherein the short-range wireless communication is infrared communications, Near Field Communication (NFC), or Bluetooth.

7. A system comprising:
a mobile terminal configured to
manage one or more user accounts,
control, for each of the one or more user accounts, an authorization of access to data for printing stored in the mobile terminal, and
associate information which is based on at least user information corresponding to one of the one or more user accounts managed by the mobile terminal with target data for printing;
an image forming apparatus having an authentication information reception unit configured to receive authentication information which is based on at least the user information corresponding to a user account for a user using the mobile terminal from the mobile terminal through a short-range wireless communication; and
an authentication server configured to
receive, from the mobile terminal, the target data for printing and the information which is associated by the mobile terminal with the target data,
receive, from the image forming apparatus, the authentication information which is received by the authentication information reception unit, and
transmit, in a case the received authentication information corresponds to the information which is associated by the mobile terminal with target data for printing, the received target data for printing to the image forming apparatus,
wherein the image forming apparatus has a data reception unit configured to receive the target data which was transmitted from the authentication server over a wired or wireless communication network, and
wherein the image forming apparatus has a print control unit configured to control, in response to the reception of the target data from the authentication server, a printer to print the target data received by the data reception unit.

8. An image forming method comprising the steps of:
receiving authentication information which is based on at least user information corresponding to a user account for a user using a mobile terminal from the mobile terminal through a short-range wireless communication, the mobile terminal managing one or more user accounts and controlling, for each of the one or more user accounts, an authorization of access to data for printing stored in the mobile terminal; and
controlling, in a case where the received authentication information corresponds to information associated by the mobile terminal with target data for printing, a printer to print the target data received by the step of receiving, the information associated with the target data being based on at least user information corresponding to one of the one or more user accounts managed by the mobile terminal.

9. A non-transitory computer readable storage medium storing a program for causing a computer to perform a method which comprises the steps of:
receiving authentication information which is based on at least user information corresponding to a user account for a user using a mobile terminal from the mobile terminal through a short-range wireless communication, the mobile terminal managing one or more user accounts and controlling, for each of the one or more user accounts, an authorization of access to data for printing stored in the mobile terminal; and controlling, in a case where the received authentication information corresponds to information associated by the mobile terminal with target data for printing, a printer to print the target data received by the step of receiving, the information associated with the target data being based on at least user information corresponding to one of the one or more user accounts managed by the mobile terminal.

10. An image forming apparatus comprising:
a memory that stores a set of instructions; and
at least one processor that executes the instructions to:
receive data associated with a user credential;
receive a user credential from a mobile terminal through a short-range wireless communication, wherein the mobile terminal manages two or more user credentials, each of which is information for identifying a user, and the received user credential is one of the two or more user credentials managed by the mobile terminal; and
control a print unit of the image forming apparatus to print the received data associated with the user credential in a case where the user credential received through the short-range wireless communication corresponds to the user credential which is associated with the received data.

11. The image forming apparatus according to claim 10, wherein the user credential is user identification information.

12. The image forming apparatus according to claim 10, wherein the at least one processor executes the instructions in the memory to:
receive the data associated with the user credential by the mobile terminal.

13. The image forming apparatus according to claim 10, wherein the short-range wireless communication is infrared communication, Near Field Communication (NFC), or Bluetooth.

14. The image forming apparatus according to claim 10, wherein the at least one processor executes the instructions in the memory to:
receive, from a server, the data associated with the user credential,
wherein the data associated with the user credential is transmitted to the server from the mobile terminal.

15. The image forming apparatus according to claim 10, wherein the user credential is information used for login to the mobile terminal.

16. The image forming apparatus according to claim 10, wherein the at least one processor executes the instructions in the memory to:
store the received data associated with the user credential in a storage device; and
control the print unit of the image forming apparatus to print the stored data associated with the user credential in a case where the user credential received through the short-range wireless communication corresponds to the user credential which is associated with the stored data.

17. A method for controlling an image forming apparatus, the method comprising the steps of:
receiving data associated with a user credential;
receiving a user credential from a mobile terminal through a short-range wireless communication, wherein the mobile terminal manages two or more user credentials, each of which is information for identifying a user, and the received user credential is one of the two or more user credentials managed by the mobile terminal; and
controlling a print unit of the image forming apparatus to print the received data associated with the user credential in a case where the user credential received through the short-range wireless communication corresponds to the user credential which is associated with the received data.

18. A non-transitory computer readable storage medium storing a program for causing a computer to perform a method which comprises the steps of:
receiving data associated with a user credential;
receiving a user credential from a mobile terminal through a short-range wireless communication, wherein the mobile terminal manages two or more user credentials, each of which is information for identifying a user, and the received user credential is one of the two or more user credentials managed by the mobile terminal; and
controlling a print unit to print the received data associated with the user credential in a case where the user credential received through the short-range wireless communication corresponds to the user credential which is associated with the received data.

* * * * *